United States Patent
Serizawa et al.

(10) Patent No.: US 7,656,431 B2
(45) Date of Patent: Feb. 2, 2010

(54) VIDEO SIGNAL PROCESSING APPARATUS AND VIDEO SIGNAL PROCESSING METHOD

(75) Inventors: Masayuki Serizawa, Machida (JP); Kenji Tabei, Sagamihara (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 10/488,271

(22) PCT Filed: Mar. 26, 2003

(86) PCT No.: PCT/JP03/03695

§ 371 (c)(1),
(2), (4) Date: Mar. 2, 2004

(87) PCT Pub. No.: WO03/085986

PCT Pub. Date: Oct. 16, 2003

(65) Prior Publication Data

US 2004/0263637 A1 Dec. 30, 2004

(30) Foreign Application Priority Data

Apr. 8, 2002 (JP) .............................. 2002-105528

(51) Int. Cl.
- *H04N 5/228* (2006.01)
- *H04N 9/73* (2006.01)
- *H04N 9/68* (2006.01)

(52) U.S. Cl. .............. 348/222.1; 348/223.1; 348/225.1; 348/228.1; 348/234; 348/235

(58) Field of Classification Search .............. 348/222.1, 348/223.1, 225.1, 228.1, 655, 647, 234, 235, 348/649–653

See application file for complete search history.

(56) References Cited

U.S. PATENT DOCUMENTS 4,831,434 A  5/1989  Fuchsberger (Continued)

FOREIGN PATENT DOCUMENTS

EP  0 677 972 A2  10/1995

(Continued)

OTHER PUBLICATIONS

Canadian Office Action dated Aug. 1, 2006.

(Continued)

*Primary Examiner*—Lin Ye
*Assistant Examiner*—Chia-Wei A Chen
(74) *Attorney, Agent, or Firm*—Dickinson Wright PLLC

(57) ABSTRACT

A video signal processing apparatus that reduces the degree of occurrences of false colors and of differing line concentration by performing knee processing properly, thereby providing desirable video signals. In the apparatus, at the occasion of generating luminance signals and color differences based on the result of knee processing, it is possible to properly generate a luminance signal which is derived from the addition result of pixels which are next to each other and generate a color difference signal which is derived from a difference of the pixels next to each other, achieved by performing the knee processing while keeping the signal level ratio at least between the pixels next to each other on video signals made up of color components arranged on a pixel by pixel basis. In this way, it is possible to keep a balance in hue of a color signal even after being subjected to knee processing.

4 Claims, 18 Drawing Sheets

U.S. PATENT DOCUMENTS

| | | | |
|---|---|---|---|
| 5,182,636 A | 1/1993 | Kikuchi | |
| 5,517,333 A * | 5/1996 | Tamura et al. | 358/518 |
| 5,729,299 A | 3/1998 | Suzuki | |
| 6,545,710 B1 * | 4/2003 | Kubo et al. | 348/223.1 |
| 6,583,820 B1 * | 6/2003 | Hung | 348/362 |
| 6,618,502 B1 * | 9/2003 | Okada et al. | 382/167 |
| 6,650,363 B1 * | 11/2003 | Ukita | 348/223.1 |
| 6,684,000 B1 * | 1/2004 | Sakurai et al. | 382/324 |
| 6,791,606 B1 * | 9/2004 | Miyano | 348/223.1 |
| 6,816,193 B1 * | 11/2004 | Kohashi et al. | 348/234 |
| 6,898,310 B1 * | 5/2005 | Ohmi et al. | 382/166 |
| 6,972,793 B1 * | 12/2005 | Kameyama | 348/256 |
| 7,065,246 B2 * | 6/2006 | Xiaomang et al. | 382/162 |
| 2002/0140828 A1 * | 10/2002 | Fukui et al. | 348/222.1 |
| 2002/0181800 A1 * | 12/2002 | Hamada et al. | 382/266 |

FOREIGN PATENT DOCUMENTS

| | | |
|---|---|---|
| EP | 0 677 972 A3 | 7/1996 |
| EP | 0 801 509 A2 | 10/1997 |
| EP | 0 677 972 B1 | 3/2000 |
| EP | 0 801 509 A3 | 8/2000 |
| EP | 1067804 | 1/2001 |
| EP | 0817504 B1 | 1/2002 |
| EP | 0 801 509 B1 | 7/2006 |
| JP | 1023439 | 1/1989 |
| JP | 04-172889 | 6/1992 |
| JP | 07-288838 | 10/1995 |
| JP | 09238359 | 9/1997 |
| JP | 10075384 | 3/1998 |
| JP | 10023437 | 1/1999 |
| JP | 2000232654 | 8/2000 |
| WO | 98/53615 | 11/1998 |

OTHER PUBLICATIONS

PCT International Search Report dated Jul. 22, 2003.
Japanese office action dated Mar. 18, 2008, with English translation.
European Search Report dated May 18, 2009.

* cited by examiner

VIDEO SIGNAL PROCESSING APPARATUS AND VIDEO SIGNAL PROCESSING METHOD

FIELD OF THE INVENTION

The present invention relates to a video signal processing apparatus and a video signal processing method, and more particularly to a video signal processing apparatus and a video signal processing method for processing signals captured with an image pickup device such as a CCD (Charge Coupled Device).

BACKGROUND ART

In the field of video cameras, as a video signal processing apparatus and a video signal processing method for performing knee processing on signals of three primary colors captured with an image pickup device such as CCD or the like, there is a conventional contrivance as described in Japanese Laid-open Patent Publication No. H9-238359.

The above-cited conventional video signal processing apparatus performs knee processing on each of R (Red) G (Green) B (Blue) primary color signal (R signal, G signal, and B signal) captured with a respective CCD which constitutes a 3CCD image pickup medium, and then generates luminance signals and color difference signals based on the signals which have been subjected to the knee processing.

FIG. 1 is a block diagram illustrating the configuration of a conventional video signal processing apparatus 10. As illustrated in FIG. 1, each primary color signal (R signal, G signal, and B signal) fed from an image pickup device is inputted into a respective gamma correction circuit 11a, 11b, and 11c corresponding to each color signal. Gamma correction circuit 11a performs gamma correction processing on R signals in accordance with the luminescent characteristics of a display apparatus such as a CRT (Cathode Ray Tube) or the like.

Knee circuit 12a performs non-linear signal compression processing on signals outputted from gamma correction circuit 11a, where such processing is targeted at signals exceeding a certain predetermined level, thereby narrowing a wide dynamic range of natural light down to a narrower dynamic range for video signals. The signals subjected to dynamic range compression at knee circuit 12a are provided to corresponding white clip circuit 13a and color difference signal generation circuit 15.

White clip circuit 13a performs white clip processing on signals outputted from knee circuit 12a, where such processing is targeted at signals exceeding a certain predetermined level, and provides the white-clipped signals to luminance signal generation circuit 14.

Meanwhile, gamma correction circuit 11b performs gamma correction processing on G signals in accordance with the luminescent characteristics of the display apparatus such as a CRT or the like. Knee circuit 12b performs non-linear signal compression processing on signals outputted from gamma correction circuit 11b, where such processing is targeted at signals exceeding a certain predetermined level, thereby narrowing a wide dynamic range of natural light down to a narrower dynamic range for video signals. The signals subjected to dynamic range compression at knee circuit 12b are provided to corresponding white clip circuit 13b and color difference signal generation circuit 5.

White clip circuit 13b performs white clip processing on signals outputted from knee circuit 12b, where such processing is targeted at signals exceeding a certain predetermined level, and provides the white-clipped signals to luminance signal generation circuit 14.

Further meanwhile, gamma correction circuit 11c performs gamma correction processing on B signals in accordance with the luminescent characteristics of the display apparatus such as a CRT or the like. Knee circuit 12c performs non-linear signal compression processing on signals outputted from gamma correction circuit 11c, where such processing is targeted at signals exceeding a certain predetermined level, thereby narrowing a wide dynamic range of natural light down to a narrower dynamic range for video signals. The signals subjected to dynamic range compression at knee circuit 12c are provided to corresponding white clip circuit 13c and color difference signal generation circuit 5.

White clip circuit 13c performs white clip processing on signals outputted from knee circuit 12c, where such processing is targeted at signals exceeding a certain predetermined level, and provides the white-clipped signals to luminance signal generation circuit 14.

Luminance signal generation circuit 14 generates luminance signals Y based on signals provided from white clip circuits 13a, 13b, and 13c. On the other hand, color difference signal generation circuit 15 generates color difference signals R−Y and B−Y by performing matrix processing based on signals provided from knee circuits 12a, 12b, and 12c.

Luminance signals Y generated by luminance signal generation circuit 14 and color difference signals R−Y and B−Y generated by color difference signal generation circuit 15 are provided to the display apparatus such as a CRT or the like.

In this way, according to conventional video signal processing apparatus 10, knee processing is performed separately on each primary color signal (R signal, G signal, and B signal) captured with an image pickup medium.

On the other hand, as another conventional video camera, there is a single CCD type camera which has a configuration in which either a primary color filter [R (Red), G (Green), B (Blue)] or a complementary color filter [Ye (Yellow), Mg (magenta), G (Green), Cy (Cyan)] is provided on the incident plane of one CCD correspondingly to pixels, and which generates luminance signals Y and color difference signals R−Y and B−Y based on color signals subjected to photoelectric conversion through either one of these color filter.

Such a single CCD type video camera employs just one CCD image pickup device, which has an advantage of ensuring a small size of an optical system and achieving a compact configuration of the video camera as a whole. Generally, knee processing is performed in this single CCD video camera, too.

However, according to conventional single CCD video cameras, either primary color signals or complementary color signals (hereafter collectively referred to as video signals) before generation of luminance signals and color difference signals are respectively subjected to color signal processing such as gamma correction, knee processing, white clipping, and so on, and accordingly, for example in a case where video signals containing a portion which exceeds a certain signal level which serves as a threshold as to whether signal compression processing is performed or not in knee processing (a knee point, that is, a reference point in knee processing) also contain a portion which does not exceed the knee point, knee processing characteristics will differ depending on whether the level of the signal exceeds the knee point or not.

In this way, when portions having different knee processing characteristics exist in a series of video signals, a problem arises; it becomes difficult to adequately generate color components when generating a color component from a difference in the signal level between each sequential pixel of the video signals subjected to knee processing.

In addition, also in a case where sequential two pixels of video signals captured with a CCD image pickup device are added up to be used for generation of luminance signals, supposing that an imaging object having a video signal level over a knee point contains some pixels whose level do not exceed the knee point, knee processing characteristics will differ depending on whether a level exceeds the knee point or not. Consequently, when it is attempted to generate luminance signals based on video signals after knee processing, in some cases, it could be difficult to acquire accurate luminance signals, which would result in a problem called a differing line concentration in which a luminance level varies from line to line even for the same imaging object.

Furthermore, in a case where flaw correction is performed after generation of luminance signals and color difference signals from output signals of a CCD image pickup device, because a filtering processing associated with the generation of the luminance signals and the color difference signals has been performed, a flaw has been spread into surrounding pixels, which results in a conventional problem of a greater difficulty in achieving a flaw detection in an appropriate manner, and the provisioning of flaw correction circuits respectively for the luminance signals and the color difference signals leads to a further conventional problem of an increased circuit scale.

DESCRIPTION OF THE INVENTION

The object of the present invention is to provide a video signal processing apparatus and a video signal processing method which allows color components (color difference signals) and luminance components (luminance signals) to be generated in an appropriate manner even when knee processing is performed.

According to one embodiment of the present invention, a video signal processing apparatus comprises a knee processing section that performs knee processing on video signals made up of color components arranged on a pixel by pixel basis, where such knee processing is performed while keeping the signal level ratio at least between pixels which are next to each other.

According to another embodiment of the present invention, a video signal processing apparatus comprises a luminance signal generation section that generates luminance signals from video signals made up of color components arranged on a pixel by pixel basis; a knee processing section that performs knee processing on the luminance signals generated by the luminance signal generation section; a change ratio calculation section that calculates the ratio of a change in the signal level of the luminance signal incident to the knee processing; a multiplication section that multiplies the video signals by the change ratio calculated by the change ratio calculation section; and a video signal processing section that generates luminance signals and color difference signals based on the video signals subjected to the change ratio multiplication.

According to further another embodiment of the present invention, a video signal processing apparatus comprises a separation section that separates luminance signals and color difference signals from video signals made up of color components arranged on a pixel by pixel basis; a knee processing section that performs knee processing on the luminance signals separated by the separation section; a change ratio calculation section that calculates the ratio of a change in the signal level of the luminance signal incident to the knee processing; a multiplication section that multiplies the color difference signals separated by the separation section by the change ratio calculated by the change ratio calculation section; and a video signal processing section that performs predetermined signal processing on the color difference signals subjected to the change ratio multiplication and on the luminance signals subjected to the knee processing.

According to still another embodiment of the present invention, a video signal processing apparatus comprises a white balance adjustment section that adjusts the white balance of video signals made up of color components arranged on a pixel by pixel basis; a luminance signal generation section that generates luminance signals from the video signals subjected to the white balance adjustment by the white balance adjustment section; a knee processing section that performs knee processing on the luminance signals generated by the luminance signal generation section; a change ratio calculation section that calculates the ratio of a change in the signal level of the luminance signal incident to the knee processing; a multiplication section that multiplies the video signals subjected to the white balance adjustment by the change ratio calculated by the change ratio calculation section; and a video signal processing section that generates luminance signals and color difference signals based on the video signals subjected to the change ratio multiplication.

According to still another embodiment of the present invention, a video signal processing apparatus comprises a white balance adjustment section that adjusts the white balance of video signals made up of color components arranged on a pixel by pixel basis; a luminance signal generation section that generates luminance signals from the video signals subjected to the white balance adjustment by the white balance adjustment section; a knee processing section that performs knee processing on the luminance signals generated by the luminance signal generation section, where such knee processing is performed with input/output characteristics in accordance with the signal level of the luminance signal; a white balance gain determination section that detects the signal level of the video signal inputted into the white balance adjustment section, determines a white balance gain which matches with the input/output characteristics in the knee processing which are applicable to the signal level, and lets the white balance adjustment section execute white balance adjustment in accordance with the determined white balance gain; a change ratio calculation section that calculates the ratio of a change in the signal level of the luminance signal incident to the knee processing; a multiplication section that multiplies the video signals subjected to the white balance adjustment by the change ratio calculated by the change ratio calculation section; and a video signal processing section that generates luminance signals and color difference signals based on the video signals subjected to the change ratio multiplication.

According to still another embodiment of the present invention, a video signal processing apparatus comprises a white balance adjustment section that adjusts the white balance of video signals made up of color components arranged on a pixel by pixel basis; a luminance signal generation section that generates luminance signals from the video signals subjected to the white balance adjustment by the white balance adjustment section; a knee processing section that performs knee processing on the luminance signals generated by the luminance signal generation section, where such knee processing is performed with either the first input/output characteristics or the second input/output characteristics in accordance with the signal level of the luminance signal; the first average value calculation section that calculates the average value of the signal levels of some luminance signals inputted into the knee processing section to which the first input/output characteristics in the knee processing are applicable, and that assigns a weight corresponding to the first input/output characteristics to the calculated first average value; the second average value calculation section that calculates the average value of the signal levels of other luminance signals inputted into the knee processing section to which the second input/output characteristics in the knee processing are applicable, and that assigns a weight corresponding to the second input/output characteristics to the calculated second average value; a white balance gain calculation section that selects either one of the first average value calculated and weighted by the first average value calculation section and the second average value calculated and weighted by the second average value calculation section based on the signal levels of the video signals, and that assigns a weight to a white balance gain of the white balance adjustment section in accordance with the selected average value; a change ratio calculation section that calculates the ratio of a change in the signal level of the luminance signal incident to the knee processing; a multiplication section that multiplies the video signals subjected to the white balance adjustment by the change ratio calculated by the change ratio calculation section; and a video signal processing section that generates luminance signals and color difference signals based on the video signals subjected to the change ratio multiplication.

According to still another embodiment of the present invention, a video signal processing method comprises a knee processing step in which knee processing is performed on video signals made up of color components arranged on a pixel by pixel basis, where such knee processing is performed while keeping the signal level ratio at least between pixels which are next to each other.

According to still another embodiment of the present invention, a video signal processing method comprises a luminance signal generation step in which luminance signals are generated from video signals made up of color components arranged on a pixel by pixel basis; a knee processing step in which knee processing is performed on the luminance signals generated by the luminance signal generation step; a change ratio calculation step in which the ratio of a change in the signal level of the luminance signal incident to the knee processing is calculated; a multiplication step in which the video signals are multiplied by the change ratio calculated in the change ratio calculation step; and a video signal processing step in which luminance signals and color difference signals are generated based on the video signals subjected to the change ratio multiplication.

According to still another embodiment of the present invention, a video signal processing method comprises a separation step in which luminance signals and color difference signals are separated from video signals made up of color components arranged on a pixel by pixel basis; a knee processing step in which knee processing is performed on the luminance signals separated by the separation step; a change ratio calculation step in which the ratio of a change in the signal level of the luminance signal incident to the knee processing is calculated; a multiplication step in which the color difference signals separated in the separation step are multiplied by the change ratio calculated in the change ratio calculation step; and a video signal processing step in which predetermined signal processing is performed on the color difference signals subjected to the change ratio multiplication and on the luminance signals subjected to the knee processing.

According to still another embodiment of the present invention, a video signal processing method comprises a white balance adjustment step in which the white balance of video signals made up of color components arranged on a pixel by pixel basis is adjusted; a luminance signal generation step in which luminance signals are generated from the video signals subjected to the white balance adjustment in the white balance adjustment step; a knee processing step in which knee processing is performed on the luminance signals generated in the luminance signal generation step; a change ratio calculation step in which the ratio of a change in the signal level of the luminance signal incident to the knee processing is calculated; a multiplication step in which the video signals subjected to the white balance adjustment are multiplied by the change ratio calculated in the change ratio calculation step; and a video signal processing step in which luminance signals and color difference signals are generated based on the video signals subjected to the change ratio multiplication.

According to still another embodiment of the present invention, a video signal processing method comprises a white balance adjustment step in which the white balance of video signals made up of color components arranged on a pixel by pixel basis is adjusted; a luminance signal generation step in which luminance signals are generated from the video signals subjected to the white balance adjustment in the white balance adjustment step; a knee processing step in which knee processing is performed on the luminance signals generated in the luminance signal generation step, where such knee processing is performed with input/output characteristics in accordance with the signal level of the luminance signal; a white balance gain determination step in which the signal level of the video signal which is subjected to white balance adjustment in the white balance adjustment step is detected, a white balance gain which matches with the input/output characteristics in the knee processing which are applicable to the signal level is determined, and which lets the white balance adjustment step execute white balance adjustment in accordance with the determined white balance gain; a change ratio calculation step in which the ratio of a change in the signal level of the luminance signal incident to the knee processing is calculated; a multiplication step in which the video signals subjected to the white balance adjustment are multiplied by the change ratio calculated in the change ratio calculation step; and a video signal processing step in which luminance signals and color difference signals are generated based on the video signals subjected to the change ratio multiplication.

According to still another embodiment of the present invention, a video signal processing method comprises a white balance adjustment step in which the white balance of video signals made up of color components arranged on a pixel by pixel basis is adjusted; a luminance signal generation step in which luminance signals are generated from the video signals subjected to the white balance adjustment in the white balance adjustment step; a knee processing step in which knee processing is performed on the luminance signals generated in the luminance signal generation step, where such knee processing is performed with either the first input/output characteristics or the second input/output characteristics in accordance with the signal level of the luminance signal; the first average value calculation step in which the average value of the signal levels of some luminance signals subjected to the knee processing in the knee processing step to which the first input/output characteristics in the knee processing are applicable is calculated, and in which a weight corresponding to the first input/output characteristics is assigned to the calculated first average value; the second average value calculation step in which the average value of the signal levels of other luminance signals subjected to the knee processing in the knee processing step to which the second input/output characteristics in the knee processing are applicable is calculated, and in which a weight corresponding to the second input/output characteristics is assigned to the calculated second average value; a white balance gain calculation step in which either one of the first average value calculated and weighted in the first average value calculation step and the second average value calculated and weighted in the second average value calculation step is selected based on the signal levels of the video signals, and in which a weight is assigned to a white balance gain of the white balance adjustment step in accordance with the selected average value; a change ratio calculation step in which the ratio of a change in the signal level of the luminance signal incident to the knee processing is calculated; a multiplication step in which the video signals subjected to the white balance adjustment are multiplied by the change ratio calculated in the change ratio calculation step; and a video signal processing step in which luminance signals and color difference signals are generated based on the video signals subjected to the change ratio multiplication.

According to still another embodiment of the invention, a video signal processing apparatus may include an obtaining section that obtains a video signal made up of color components arranged on a pixel by pixel basis. A luminance signal generating section generates a luminance signal of the obtained video signal by averaging color components of neighboring pixels in the obtained video signal. And a knee processing section performs knee processing on the generated luminance signal.

According to still another embodiment of the invention, a video signal processing method may include obtaining a video signal made up of color components arranged on a pixel by pixel basis, generating a luminance signal of the obtained video signal by averaging color components of neighboring pixels in the obtained video signal, and performing knee processing on the generated luminance signal.

BEST MODE FOR CARRYING OUT THE INVENTION

Embodiments of the present invention will be described in detail below with reference to the accompanying drawings.

EMBODIMENT 1

Figure 1:
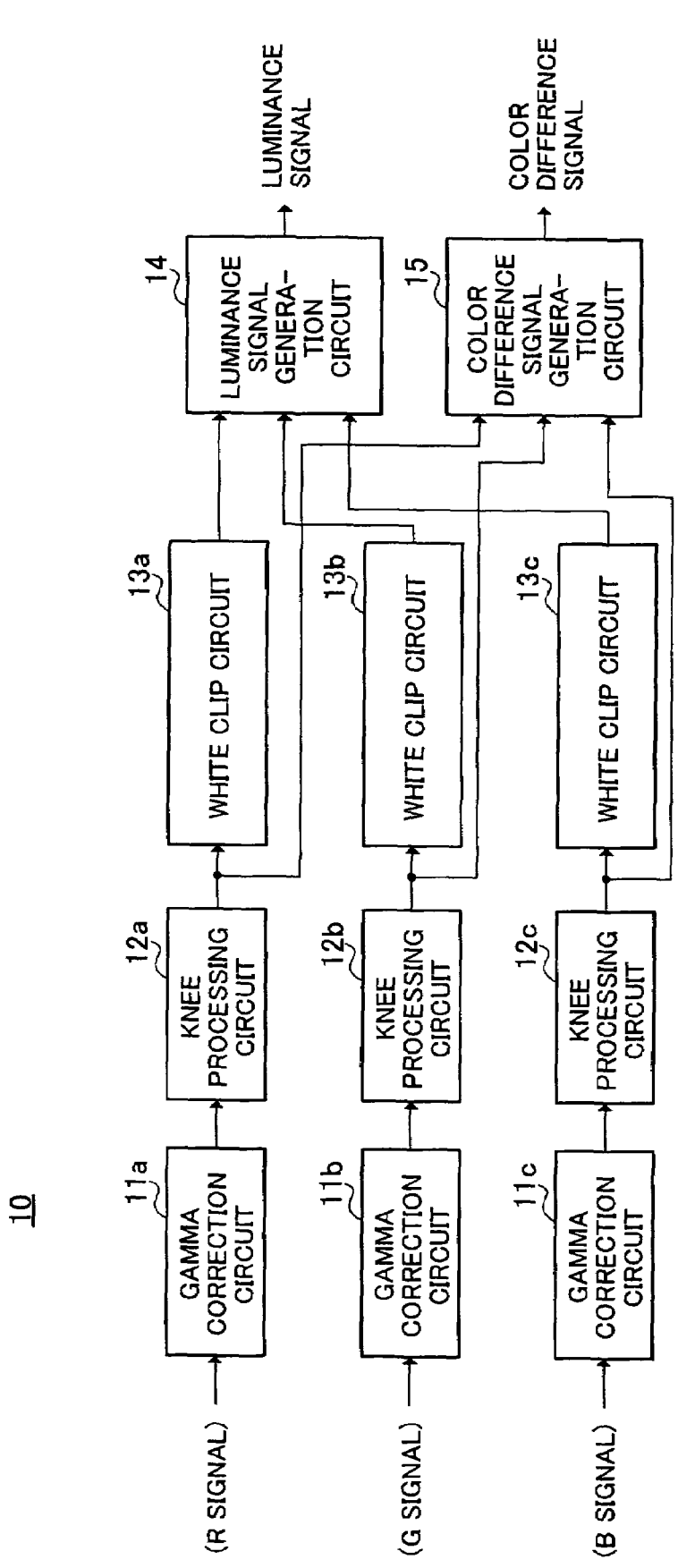
FIG. 1 is a block diagram illustrating the configuration of a conventional video signal processing apparatus.
Figure 2:
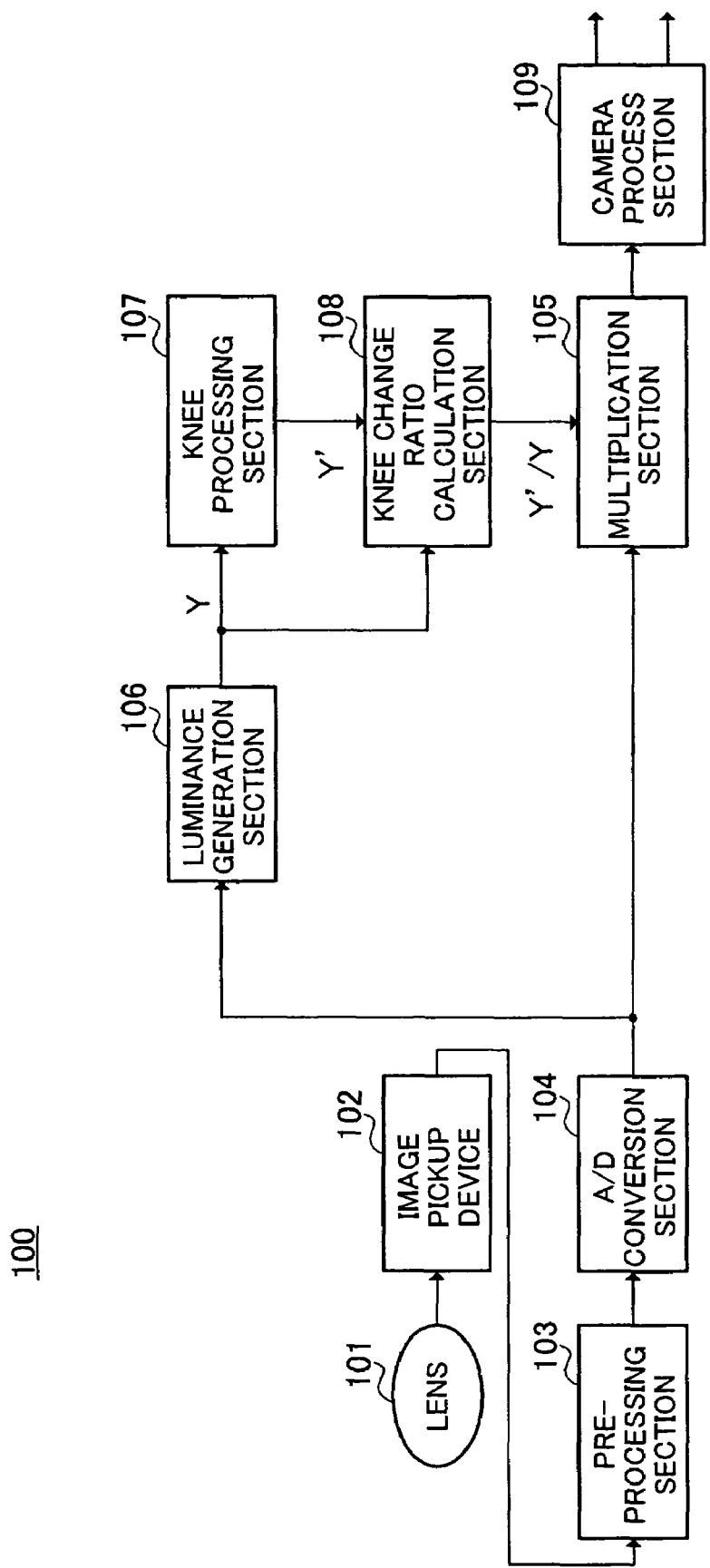
FIG. 2 is a block diagram illustrating the configuration of a video signal processing apparatus according to Embodiment 1 of the present invention.

FIG. 2 is a block diagram illustrating the configuration of video signal processing apparatus 100 of a video camera according to Embodiment 1 of the present invention.

In a video camera, a light from an imaging object passing through lens 101 enters CCD image pickup device 102 which constitutes a single CCD image pickup section. CCD image pickup device 102 feeds analog video signals, obtained by photo-electrically converting the light from the imaging object into electric charge, to pre-processing section 103.

Pre-processing section 103 comprises a CDS (Correlated Double Sampling) circuit for removing a reset noise from the analog video signal provided from CCD image pickup device 102, an AGC (Automatic Gain Control) circuit for keeping its signal level constant by performing the amplitude control on the video signal after being subjected to noise component removal at the CDS circuit, and a clamp circuit for performing a clamp processing on the video signal after being subjected to the amplitude control at the AGC circuit for the purpose of A/D (Analog-to-Digital) conversion processing at its later processing stage.

The video signal outputted from the pre-processing section 103 is provided to A/D conversion section 104. The A/D conversion section 104 converts the analog video signals provided from the pre-processing section 103 to digital signals, and the provides the converted signals to luminance generation section 106 and multiplication section 105 respectively.

The luminance generation section 106 generates luminance signals Y by passing the digital signals provided from the A/D conversion section 104 through a LPF (low-pass filter) having characteristics of $1+Z^{-1}$ and so on, and provides the generated luminance signal Y to knee processing section 107 and knee change ratio calculation section 108 respectively.

The knee processing section 107 performs knee processing on the luminance signal Y provided from the luminance generation section 106, where, in the knee processing, the portion of signal component exceeding a predetermined signal level (knee point) of the luminance signal Y is subjected to compression, and then provides the luminance signal Y' after being subjected to the knee processing to the knee change ratio calculation section 108.

The knee change ratio calculation section 108 calculates the change ratio Y'/Y resulting from the knee processing of the luminance signal level based on the luminance signal Y' provided from the knee processing section 107 and the luminance signal Y generated at the above-described luminance generation section 106, and then provides the calculated change ratio to the multiplication section 105.

The multiplication section 105 multiplies the digital signal provided from the A/D conversion section 104 by the change ratio Y'/Y provided from the knee change ratio calculation section 108. That is, the section 105 multiplies the digital video signal, which is prior to being subjected to processing for conversion into the luminance signal Y, by the change ratio Y'/Y, which is derived from the knee processing which generates the luminance signal Y', and then provides the multiplied result to camera process section 109.

After performing a set of signal processing such as gamma correction, edge correction, and the like, on the multiplied result provided from the multiplication section 108, the camera process section 109 generates final luminance signals and color difference signals to output the generated final signals.

Figures 3A, 3B:
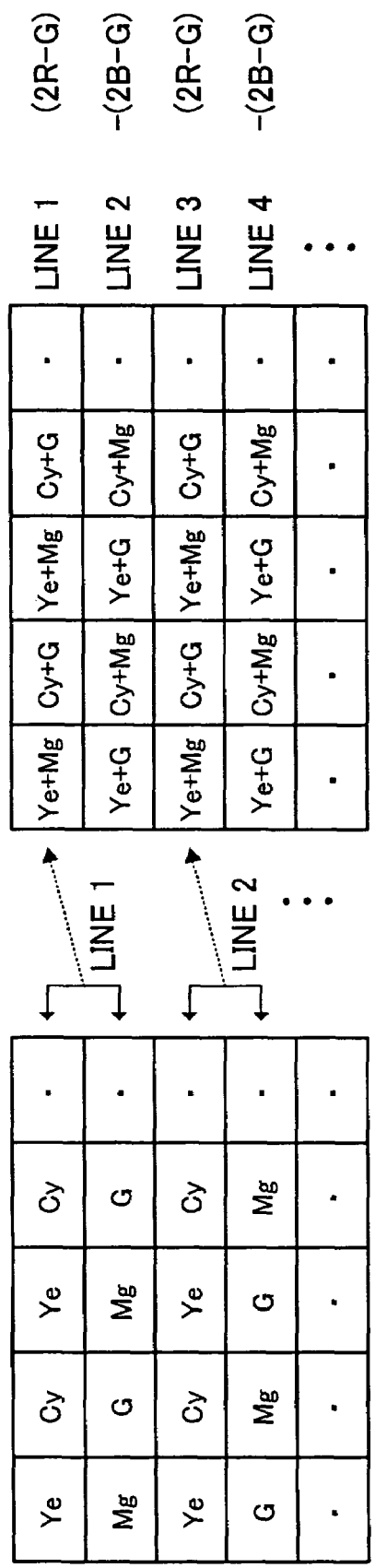
FIG. 3A is a schematic diagram for illustration of a complementary-color color filter according to Embodiment 1 of the present invention.
FIG. 3B is a schematic diagram for illustration of the output from an image pickup device according to Embodiment 1 of the present invention.

Under the above configuration, in the case of the complementary-color CCD image pickup device 102, a color filter of Ye (Yellow), Cy (Cyan), and Mg (Magenta) having a complementary-color relationship to each other, as well as G (Green), is affixed to each pixel as illustrated in FIG. 3(A) An output signal (video signal) of the CCD image pickup device 102 obtained through the color filter are subjected to an addition processing prior to outputting thereof, where a pair of pixels which are vertically adjacent to each other on the color filter is added up; and as illustrated in FIG. 3(B), the output signal is outputted from the image pickup device as one line of video signal including two lines, which is a combination of an upper line and a lower line, on the color filter. It is noted that, though descriptions herein assume a complementary-color image pickup device, there are other types of image pickup devices which have a primary-color RGB color filter affixed thereto.

Now, the relationships among color components Ye, Cy, and Mg, constituting a complementary-color relation to each other, are expressed by the following equations (Eq. 1)-(Eq. 3).

$$Ye=G+R \tag{Eq. 1}$$

$$Mg=R+B \tag{Eq. 2}$$

$$Cy=G+B \tag{Eq. 3}$$

Among the video signals illustrated in FIG. 3(B), the luminance generation section 106 calculates the luminance signal Y by averaging pixels next to each other for each line.

That is, at the luminance generation section 106, the luminance signal Y is generated for each line in accordance with the following equations (Eq. 4) and (Eq. 5), which are based on the above-described (Eq. 1)-(Eq. 3).

$$Y\approx\{(Ye+Mg)+(Cy+G)\}/2=(2R+3G+2B)/2 \tag{Eq. 4}$$

$$Y\approx\{(Ye+G)+(Cy+Mg)\}/2=(2R+3G+2B)/2 \tag{Eq. 5}$$

Specifically, the luminance generation section 106 produces the luminance signal Y through the working so fan LPF (low-pass filter) having characteristics of $(1+Z^{-1})/2$.

Figure 4:
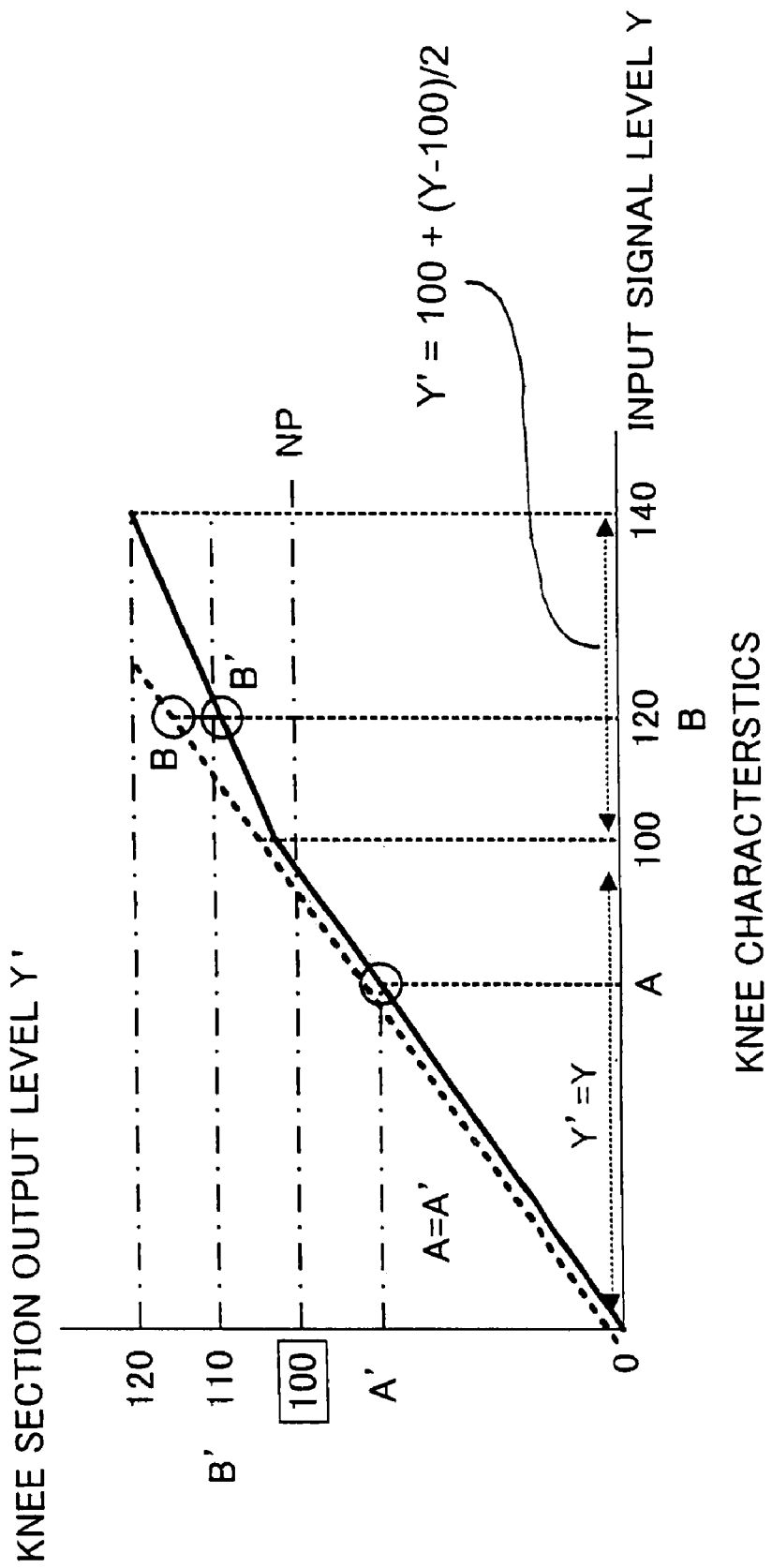
FIG. 4 is a schematic diagram for illustration of knee processing characteristics of a knee processing section according to Embodiment 1 of the present invention.

Knee processing section 107 performs signal level conversion on the luminance signal Y generated at the luminance generation section 106, where the conversion is performed based on input/output characteristics as illustrated in a solid line in FIG. 4, thereby obtaining the knee-processed luminance signal Y' by going through the knee processing, through which the level of an output signal exceeding the knee point is compressed. Incidentally, in FIG. 4, a broken line indicates input/output characteristics for a case where no knee processing is performed.

In the case of the present embodiment, assuming that the knee point NP is set at the signal level of "100", and further assuming that the signal level (Y) of the knee-processed luminance signal Y' which is outputted from the knee processing section 107 is equal to or less than "100", the signal level (Y') of the knee-processed luminance signal Y' which is outputted from the knee processing section 107 is calculated according to the following equation (Eq. 6).

$$(Y')=Y \tag{Eq. 6}$$

In contrast to the above, in the case where the signal level (Y) of the knee-processed luminance signal Y' which is outputted from the knee processing section 107 is greater than "100", the signal level (Y') of the knee-processed luminance signal Y' which is outputted from the knee processing section 107 is calculated according to the following equation (Eq. 7).

$$(Y')=100+(Y-100)/2 \tag{Eq. 7}$$

Accordingly, in FIG. 4, assuming that the input level of the luminance signal Y is (A), the output level of the luminance signal Y' from the knee processing section 107 is (A') having the same level as that of the input level, whereas in the case where the input level of the luminance signal Y is (B), the output level of the luminance signal Y' from the knee processing section 107 is (B') having the lower level than that of the input level (B).

At the knee change ratio calculation section 108, the ratio between the luminance signal Y' after being subjected to the knee processing at the knee processing section 107 and the luminance signal Y prior to being subjected to the knee processing (knee change ratio Y'/Y) is calculated.

At the multiplication section 105, the digital video signal outputted from the A/D conversion section 104 is then multiplied by the knee change ratio (Y'/Y) calculated at the knee change ratio calculation section 108. Consequently, the video signal inputted into the multiplication section 105 is changed in accordance with the amount of a change in the luminance signal through the process of the knee processing. Incidentally, assuming that the video signal outputted from the A/D conversion section 104 is $AD_{OUT}$, the video signal outputted from the multiplication section 105 is calculated in accordance with the equation of $AD_{OUT}(Y'/Y)$, where Y' is the knee-processed luminance signal outputted from the knee processing section 107, and Y is the luminance signal outputted from the luminance generation section 106.

From the video signal controlled in this way in accordance with the amount of the change in the luminance signal through the process of the knee processing, color difference signals are generated at the camera process section 109. In the case of such generation, the calculation of color difference signals R–Y and B–Y at the camera process section 109 is done by determining the difference between pixels next to each other among respective pixels illustrated in FIG. 3B, or more specifically, in accordance with the following equations (Eq. 8) and (Eq. 9).

$$R-Y \approx (Ye+Mg)-(Cy+G)=(2R-G)' \qquad (Eq.\ 8)$$

$$B-Y \approx (Ye+G)-(Cy+Mg)=-(2B-G)' \qquad (Eq.\ 9)$$

In regard to such color difference signals, because each line of (2R–G)' which indicates odd lines and of –(2B–G)' which indicates even lines are multiplied by the same coefficient of Y'/Y, a balance between each of R–Y lines and B–Y lines is kept, eliminating a possibility of a hue change due to an unbalance between them.

Figure 7A:
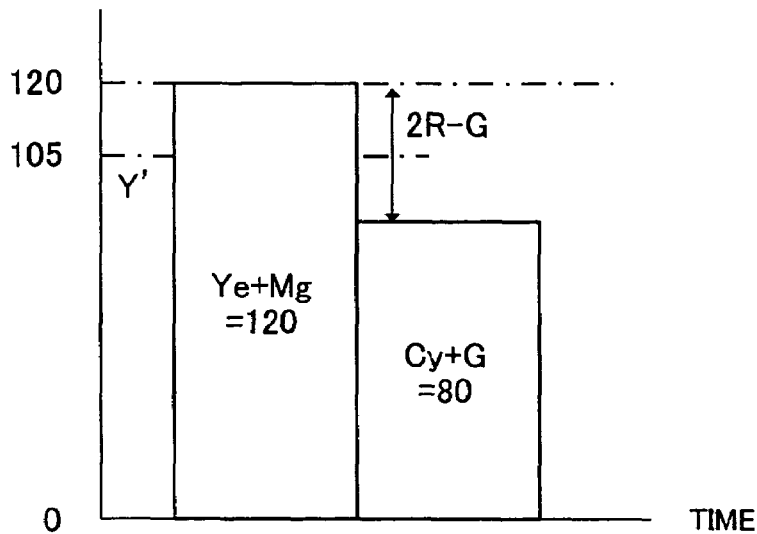
FIG. 7A is a schematic diagram illustrating the luminance signal level and the color difference signal level of pixels adjacent to each other in a (2R–G) line after being subjected to knee processing according to Embodiment 1 of the present invention.
Figure 7B:
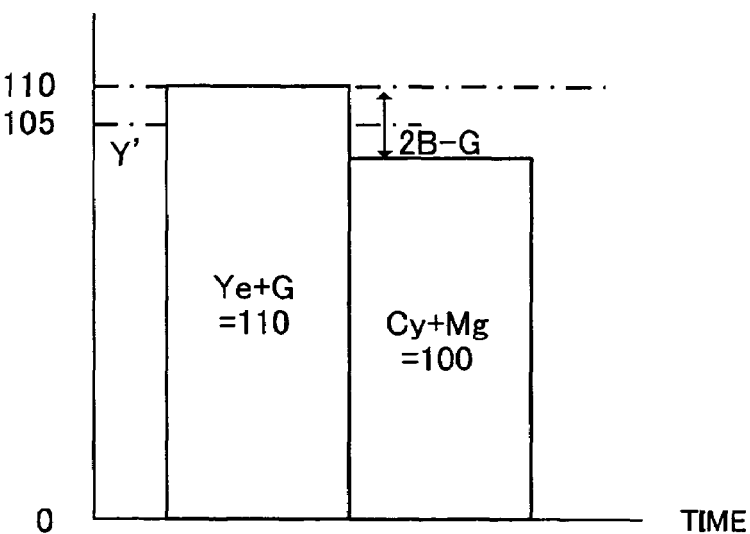
FIG. 7B is a schematic diagram illustrating the luminance signal level and the color difference signal level of pixels adjacent to each other in a (2B–G) line after being subjected to knee processing according to Embodiment 1 of the present invention.

In addition, also in regard to the luminance signal Y' calculated at the camera process section 109, each of the (2R–G)' line and of the –(2B–G)' line has the identical signal level as illustrated in FIG. 7(A) and FIG. 7(B). Accordingly, at the camera process section 109, it is possible to obtain good video signals (luminance signals and color difference signals) free from differing line concentration or false colors even when various kinds of signal processing such as edge correction, gamma correction, and so on are carried out.

Figure 5A:
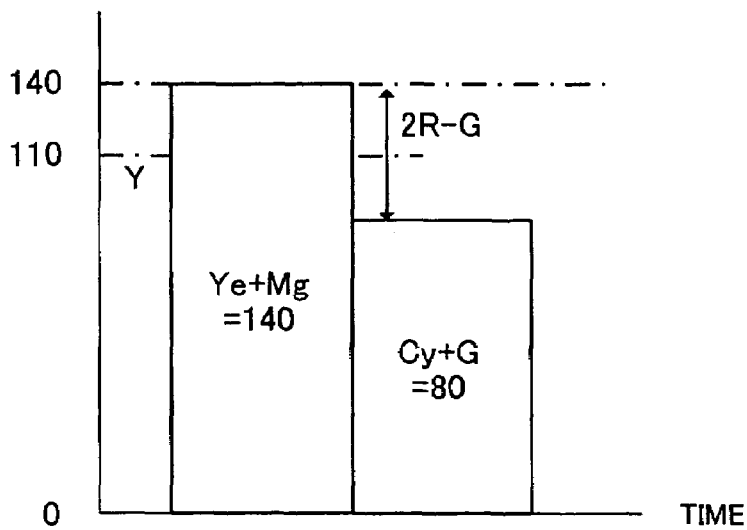
FIG. 5A is a schematic diagram illustrating the luminance signal level and the color difference signal level of pixels adjacent to each other in a (2R–G) line prior to being subjected to knee processing.
Figure 5B:
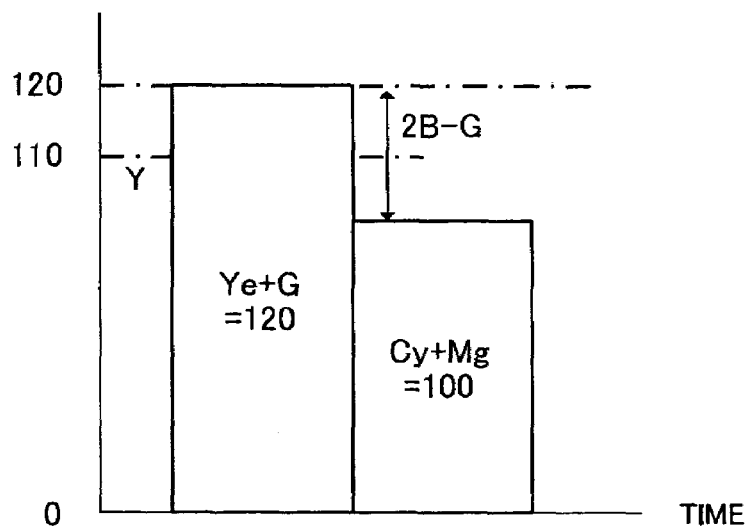
FIG. 5B is a schematic diagram illustrating the luminance signal level and the color difference signal level of pixels adjacent to each other in a (2B–G) line prior to being subjected to knee processing.

It is noted that FIG. 5(A) and FIG. 5(B) illustrates the video signal level, the color difference signal level (2R–G), –(2B–G), and the signal level (Y) of the luminance signal Y for each pixels next to each other of Ye+Mg and Cy+G for the (2R–G) lines prior to the knee processing, or of Ye+G and Cy+Mg for the –(2B–G) lines prior to the knee processing.

Figure 6A:
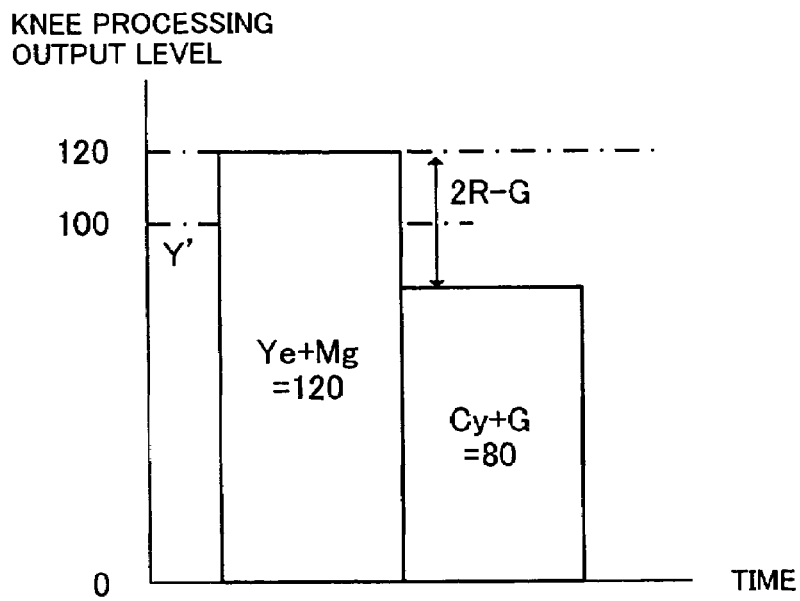
FIG. 6A is a conventional schematic diagram illustrating the luminance signal level and the color difference signal level of pixels adjacent to each other in a (2R–G) line after being subjected to knee processing.
Figure 6B:
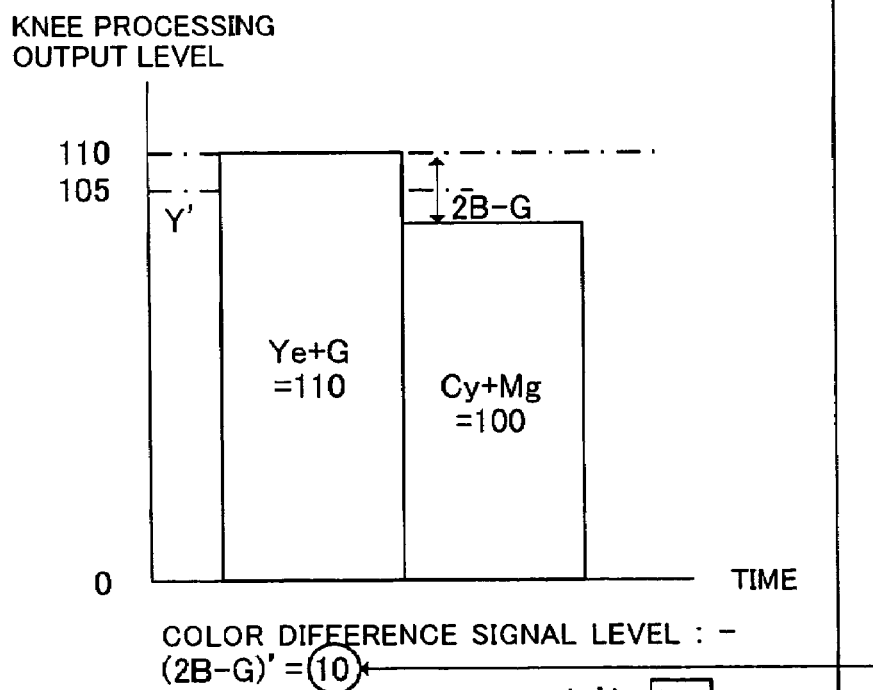
FIG. 6B is a conventional schematic diagram illustrating the luminance signal level and the color difference signal level of pixels adjacent to each other in a (2B–G) line after being subjected to knee processing.

It is further noted that FIG. 6(A) and FIG. 6(B) illustrates the video signal level, the color difference signal level (2R–G)', –(2B–G)', and the signal level (Y') of the luminance signal Y' for each pixels next to each other of Ye+Mg and Cy+G for the (2R–G) lines after the conventional knee processing, or of Ye+G and Cy+Mg for the –(2B–G) lines after the conventional knee processing.

It is further noted that FIG. 7(A) and FIG. 7(B) illustrates the video signal level, the color difference signal level (2R–G)', –(2B–G)', and the signal level of the luminance signal Y' (Y') for each pixels next to each other of Ye+Mg and Cy+G for the (2R–G) lines, or of Ye+G and Cy+Mg for the –(2B–G) lines, respectively as the result of the multiplication by the knee change ratio Y'/Y after the knee processing according to the embodiment of the present invention. As illustrated in FIG. 7(A) and FIG. 7(B), the video signal provided to the camera process section 109 according to the present embodiment has been multiplied by the knee change ratio Y'/Y, which is identical for both lines, at the multiplication section 105; accordingly, assuming that, for example, the level of the luminance signal generated based on the luminance signal prior to the knee processing is "110" as illustrated in FIG. 5(A) and FIG. 5(B), which is the identical luminance signal level both for the (2R–G) lines and for the –(2B–G) lines, the level of the luminance signal generated based on the video signal outputted from the multiplication section 105 should be "105," which is also the identical luminance signal level both for the (2R–G) lines and for the –(2B–G) lines.

Therefore, the signal level (Y') of the luminance signal Y' outputted from the camera process section 109 matches up for each line as illustrated in FIG. 7(A) and FIG. 7(B), which enables the cause of differing line concentration to be addressed for improvement. Furthermore, because the level of the color difference signals are calculated based on the multiplication result of each video signal level prior to the knee processing multiplied by the identical knee change ratio Y'/Y, a balance between the signal level of each pixel for the (2R–G) lines and for the –(2B–G) lines is kept, which enables the cause of false colors in the color difference signals generated at the camera process section 109 to be addressed for improvement.

As described above, according to video signal processing apparatus 100 of the present embodiment, instead of performing knee processing on a video signal before separation of a luminance component and a color difference component, which is outputted from A/D conversion section 104, the video signal is temporarily converted into a luminance signal which is the average of pixels next to each other, and after that, a knee processing is performed on the converted luminance signal, which makes it possible to perform the knee processing while keeping a balanced condition in which a hue remains unchanged between the pixels next to each other.

Furthermore, by multiplying the video signal outputted from the A/D conversion section 104 by Y'/Y, which is the ratio of the change in the luminance signal between the levels before and after the knee processing, it is possible to perform a signal level control in accordance with the amount of the change in the luminance signal due to the knee processing while keeping a balanced condition in which a hue remains unchanged between the pixels next to each other on the video signal, or in other words, it is possible to perform a signal level control equivalent to the knee processing while keeping a balance between pixels adjacent to each other. Accordingly, at the camera process section 109, because luminance signals and color difference signals are generated based on the signal levels of pixels next to each other of the video signal inputted therein, such generation of the luminance signals and the color difference signals is made based on the signal in which a balance is kept between the signal levels of its pixels adjacent to each other, and consequently, it is possible to prevent differing line concentration and false colors from occurring.

It is noted that, though it is described in the above embodiment regarding a case where the complementary-color CCD image pickup device 102 is employed, the present invention is not limited to such a particular implementation; instead, it is possible to expect a similar effect even in a case where a primary-color Bayer pattern image pickup device or the like is alternatively used.

EMBODIMENT 2

Figure 8:
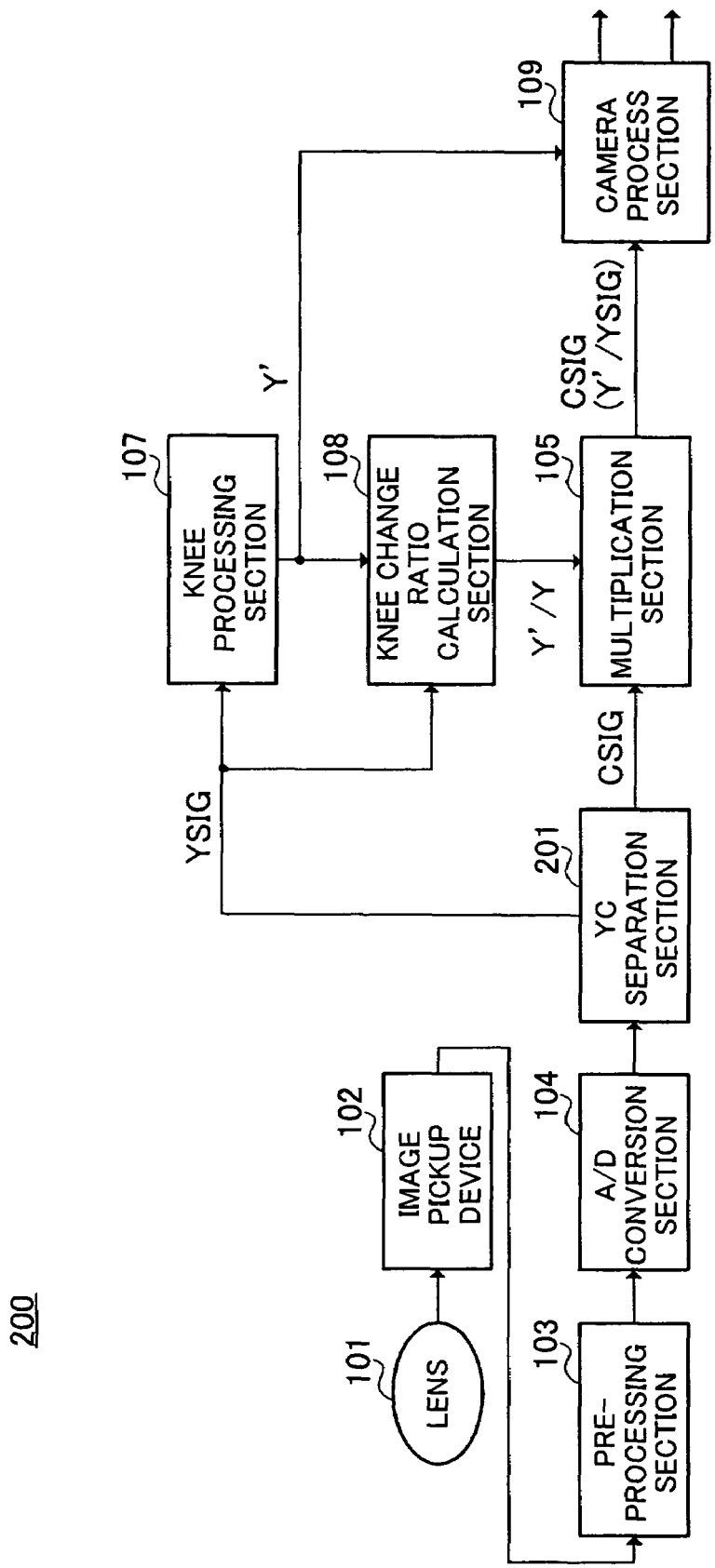
FIG. 8 is a block diagram illustrating the configuration of a video signal processing apparatus according to Embodiment 2 of the present invention.

FIG. 8 is a block diagram illustrating the configuration of video signal processing apparatus 200 of a video camera according to Embodiment 2 of the present invention. In the figure herein, the identical reference numerals are assigned to the parts identical to those in FIG. 2, and their detailed explanation is omitted here.

In FIG. 8, the video signal processing apparatus 200 has a configuration in which YC separation section 201 for generating luminance signals YSIG and color difference signals CSIG is additionally provided over the configuration of the video signal processing apparatus 100 according to the Embodiment 1 described above with reference to FIG. 2, with the luminance generation section 106 according to the apparatus 100 deleted and not provided herein.

The YC separation section 201 performs computation according to the above-specified equations (Eq. 4) and (Eq. 5) on digital video signals provided from A/D conversion section 104 to generate the luminance signals YSIG, and in addition to that, generates the color difference signals CSIG by performing computation according to the above-specified equations (Eq. 8) and (Eq. 9) on the same provided signals.

Knee processing section 107 performs knee processing on the luminance signals YSIG provided from the YC separation section 201, and after that, provides the processed result to knee change ratio calculation section 108. In the same manner as done in the case described above with reference to FIG. 2, the knee change ratio calculation section 108 calculates a knee change ratio Y'/YSIG based on the luminance signal YSIG and the knee-processed result, that is, the luminance signal Y'.

Multiplication section 105 multiplies the knee change ratio Y'/YSIG calculated by the knee change ratio calculation section 108 by the color difference signal CSIG provided from the YC separation section 201. Consequently, the color difference signal CSIG subjected to the multiplication should be a color difference signal CSIG (Y'/YSIG), in which a change in accordance with the amount of the change in the luminance signal due to the knee processing is incorporated.

In this way, the knee processing is performed on the luminance signal YSIG which has already been separated at the YC separation section 201, and in addition to that, the color difference signal CSIG which has already been separated at the YC separation section 201 is multiplied by the knee change ratio (Y'/YSIG); therefore, camera process section 109 generates and outputs a luminance signal and a color difference signal based on the knee-processed luminance signal Y' and the color difference signal which has been subjected to the multiplication of the knee change ratio (Y'/YSIG). This makes it possible to obtain the color difference signal CSIG (Y'/YSIG), which is corrected in accordance with the knee change ratio (Y'/YSIG) on the luminance signal Y'. Therefore, compared with a case where a knee processing is individually performed on a luminance signal and a color difference signal, it is possible to keep a hue balance.

As described above, according to the vide signal processing apparatus 200 of the present embodiment, the knee change ratio (Y'/YSIG) derived from the knee processing performed on the luminance signal Y'is also applied to the color difference signal CSIG in a feedback manner, that is, the same processing as the knee processing performed on the luminance signal Y' is also performed on the CSIG, thereby making it possible to keep a hue balance of a color difference signal after processing such as gamma correction, edge correction, and soon, at the camera process section 109.

EMBODIMENT 3

Figure 9:
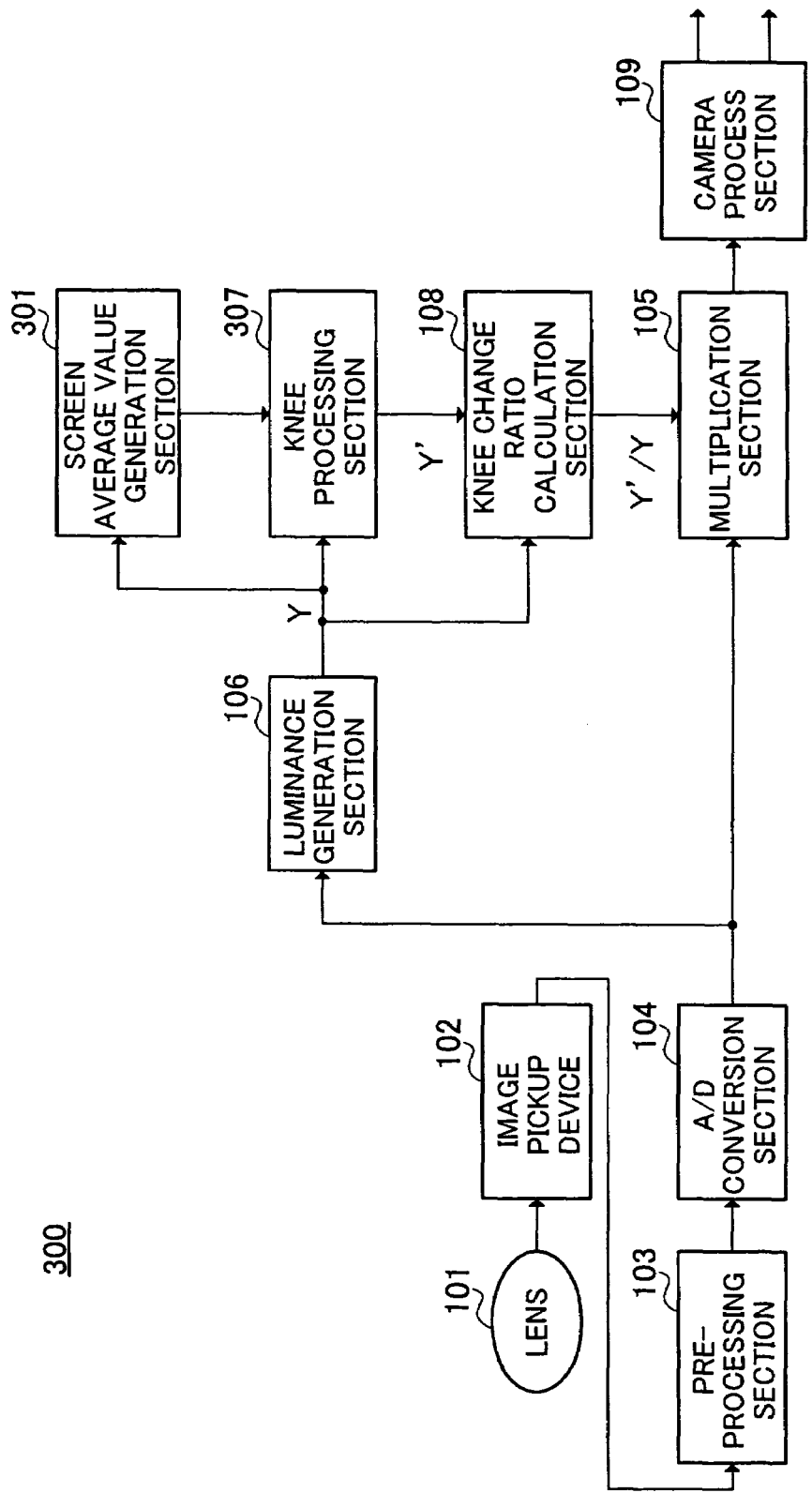
FIG. 9 is a block diagram illustrating the configuration of a video signal processing apparatus according to Embodiment 3 of the present invention.

FIG. 9 is a block diagram illustrating the configuration of video signal processing apparatus 300 of a video camera according to Embodiment 3 of the present invention. In the figure herein, the identical reference numerals are assigned to the parts identical to those in FIG. 2, and their detailed explanation is omitted here.

In FIG. 9, the video signal processing apparatus 300 has a configuration in which screen average value generation section 301 for calculating the average value of luminance signals Y on one screen is additionally provided over the configuration of the video signal processing apparatus 100 according to the Embodiment 1 described above with reference to FIG. 2.

The screen average value generation section 301 calculates the average value on one screen based on the luminance signals Y provided from luminance generation section 106, and varies a knee point (referential threshold point) for knee processing performed on the luminance signal Y at knee processing section 307 depending on whether the calculation result is greater than a predetermined reference value or not.

Figure 10:
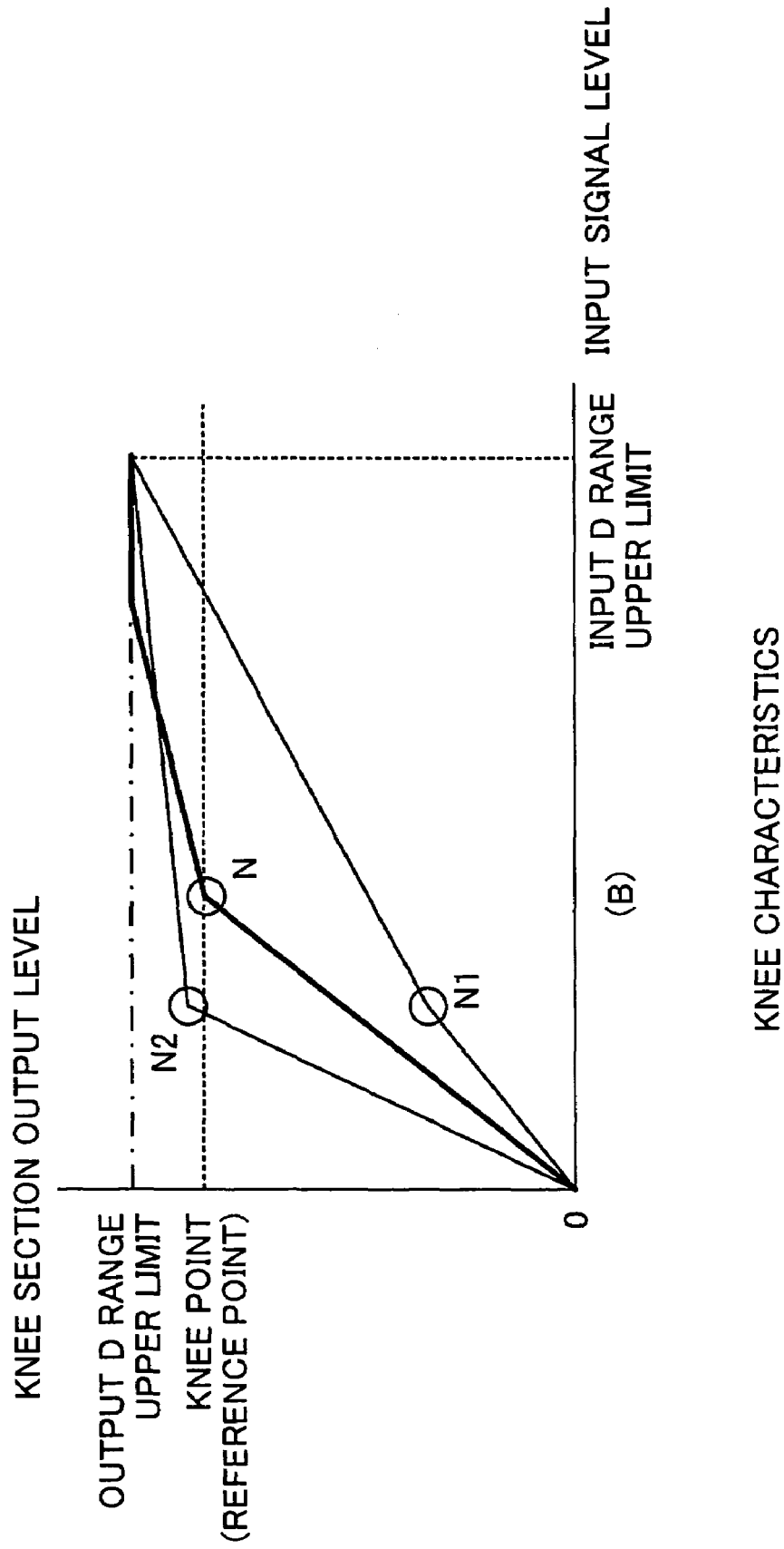
FIG. 10 is a schematic diagram illustrating the knee characteristics of a knee processing section according to Embodiment 3 of the present invention.

Namely, in a case where the luminance average value for one screen, Yave, is greater than a referential threshold point, Yth, as illustrated in FIG. 10, the screen average value generation section 301 lowers the knee point applied in the knee processing section 307 from the referential knee point N to a new knee point N1, thereby making it possible to reproduce a screen which contains many white gradation components in the range of white gradations in a fully satisfactory manner, alleviating a problematic phenomenon which is so-called white gradation component mis-reproduction.

On the other hand, in a case where the luminance average value for one screen, Yave, is less than a referential threshold point, Yth, as illustrated in FIG. 10, the screen average value generation section 301 raises the knee point applied in the knee processing section 307 from the referential knee point N to a new knee point N2, thereby making it possible to reproduce a screen which contains a lot of black gradation components in the range of black gradations in a fully satisfactory manner, alleviating a problematic phenomenon called as "black gradation component mis-reproduction."

As described above, it is possible to make the most of output dynamic range at the knee processing section 307 by varying the knee point N in accordance with the luminance average value for one screen, Yave, generated by the screen average value generation section 301.

Consequently, it is possible to keep good gradations of an imaging object, and even after various kinds of signal processing such as gamma correction, edge correction, and so on, at camera process section 109, the final luminance signal and the final color difference signal should have good gradations in accordance with the brightness of the imaging object.

As described above, according to video signal processing apparatus 300 of the present embodiment, instead of performing knee processing on each pixel of a video signal, the video signal is temporarily converted into a luminance signal which is the average of pixels next to each other, and after that, a knee processing is performed on the converted luminance signal, which makes it possible to perform the knee processing while keeping a balance between the pixels next to each other, and also makes it possible to reproduce video with good gradations by alleviating a phenomenon such as white or black gradation component mis-reproduction.

EMBODIMENT 4

Figure 11:
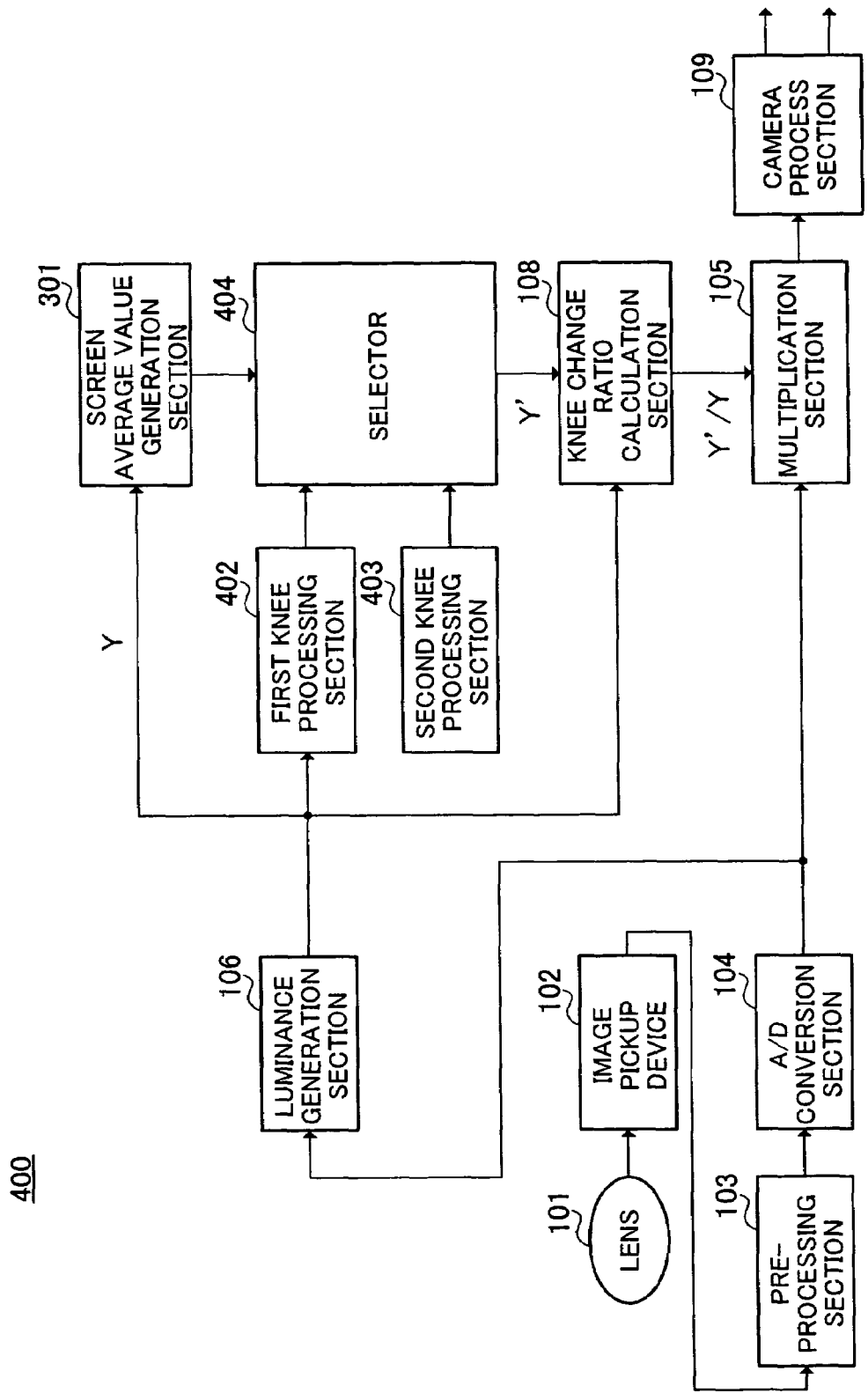
FIG. 11 is a block diagram illustrating the configuration of a video signal processing apparatus according to Embodiment 4 of the present invention.

FIG. 11 is a block diagram illustrating the configuration of video signal processing apparatus 400 of a video camera according to Embodiment 4 of the present invention. In the figure herein, the identical reference numerals are assigned to the parts identical to those in FIG. 9, and their detailed explanation is omitted here.

Compared with the video signal processing apparatus 300 according to Embodiment 3 described above with reference to FIG. 9, video signal processing apparatus 400 illustrated in FIG. 11 selects either one of first knee processing section 402 and second knee processing section 403 having a knee point different from each other through the workings of selector 404 based on the average value of luminance signals Y in a screen outputted from screen average value generation section 301, and provides the output from the selected knee processing section to knee change ratio calculation section 108.

For example, a low knee point just as in the knee point N1 illustrated in FIG. 10 is set at the first knee processing section 402 as its knee point, whereas a high knee point just as in the knee point N2 illustrated in FIG. 10 is set at the second knee processing section 403 as its knee point.

In a case where the average value of the luminance signals Y in the screen outputted from the screen average value generation section 301 is greater than the predetermined referential level set in advance, the selector 404 selects the first knee processing section 402 based on the average value of the luminance signals. This ensures a clear video processing in a high brightness.

In contrast, in a case where the average value of the luminance signals Y in the screen outputted from the screen average value generation section 301 is less than the predetermined referential level set in advance, the selector 404 selects the second knee processing section 403 based on the average value of the luminance signals. This ensures a clear video processing in a low brightness.

As described above, according to video signal processing apparatus 400 of the present embodiment, instead of performing knee processing on each pixel of a video signal, the video signal is temporarily converted into a luminance signal which is the average of pixels next to each other, and after that, a knee processing is performed on the converted luminance signal, which makes it possible to perform the knee processing while keeping a balance between the pixels next to each other, and also makes it possible to reproduce video with good gradations by alleviating a phenomenon such as white or black gradation component mis-reproduction.

It is noted that, though it is described in the above embodiment regarding a case where just two knee processing sections each of which has a knee point different from that of the other (first knee processing section 402 and second knee processing section 403) are employed, the present invention is not limited to such a particular implementation; instead, it may alternatively be configured in such a way that more than two knee processing sections each of which has a knee point different from that of the others are provided for switching thereof based on the average value of the luminance signals Y. Such an alternative configuration ensures the realization of gradation expression in accordance with finer luminance levels, further ensuring a greater image quality.

EMBODIMENT 5

Figure 12:
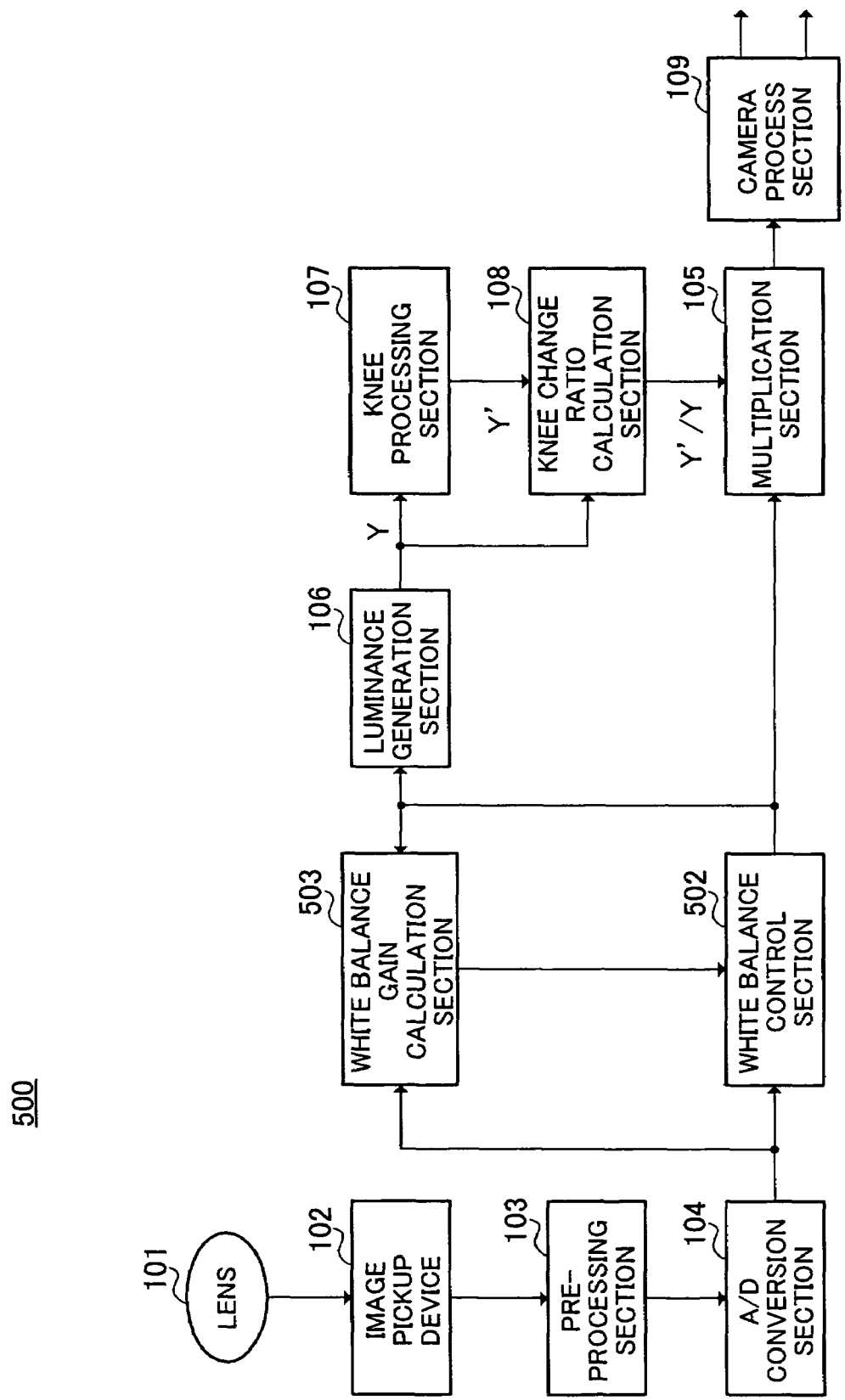
FIG. 12 is a block diagram illustrating the configuration of a video signal processing apparatus according to Embodiment 5 of the present invention.

FIG. 12 is a block diagram illustrating the configuration of video signal processing apparatus 500 of a video camera according to Embodiment 5 of the present invention. In the figure herein, the identical reference numerals are assigned to the parts identical to those in FIG. 2, and their detailed explanation is omitted here.

Compared with the video signal processing apparatus 100 according to Embodiment 1 described above with reference to FIG. 2, video signal processing apparatus 500 illustrated in FIG. 12 has a difference in that the apparatus 500 has additional configuration components of white balance control section 502 for performing a white balance control on video signals outputted from A/D conversion section 104, and white balance gain calculation section 503 for calculating a white balance gain for the white balance control section 502.

The white balance gain calculation section 503 calculates the average value for each color in one screen based on the video signal outputted from the A/D conversion section 104, and further calculates a white balance gain which achieves equal color proportions between 2R−G and 2B−G based on the calculated average value, and provides the calculation result to the white balance control section 502.

Based on the white balance gain provided from the white balance gain calculation section 503, the white balance control section 502 performs a white balance control by adjusting each color level. With this procedure, the white balance control section 502 outputs video signals subjected to the balance adjustment for each color.

Using pixels next to each other of the video signals subjected to the white balance adjustment outputted from the white balance control section 502, luminance generation section 106 generates a luminance signal Y by performing the above-described computation in accordance with the above-specified equations (Eq. 4) and (Eq. 5), and provides the generated signal to knee processing section 107 and knee change ratio calculation section 108.

With this procedure, at the knee processing section 107, the knee processing is performed based on the luminance signal Y subjected to the white balance adjustment, that is, based on the luminance signal Y in which the signal level of each pixel is properly adjusted. In addition, also at the knee change ratio calculation section 108, it is possible to calculate the proper knee change ratio (Y′/Y), derived from the luminance signal Y subjected to the white balance adjustment and from the result of the knee processing performed based on the luminance signal Y.

In such a manner, the video signal subjected to the white balance adjustment outputted from the white balance control section 502 is multiplied by the knee change ratio (Y′/Y) at the multiplication section 105, and accordingly, the white-balance-adjusted signal multiplied by the proper knee change ratio (Y′/Y) derived from the white balanced signal is provided to the camera process section 109.

Therefore, at the camera process section 109, white-balance-adjusted luminance signals and color difference signals subjected to the proper knee processing are obtained by performing signal processing such as gamma correction, edge correction, and so on, based on the video signals provided from the multiplication section 105.

As described above, according to the video signal processing apparatus 500 of the present embodiment, a luminance signal Y which is generated for performing knee processing has been subjected to white balance adjustment in advance, and accordingly the knee processing is performed based on the color-component-adjusted luminance signal Y. Consequently, the signal level of pixels in (2R−G) lines, (Ye+Mg, Cy+G), and the signal level of pixels in (2B−G) lines, (Ye+G, Cy+Mg), prior to knee processing described above with reference to FIG. 5(A) and FIG. 5(B) are properly adjusted through white balance control, and the knee processing is performed based on the luminance signal Y subjected to the proper white balance adjustment; accordingly, it is possible alleviate the problem of unbalanced compression where just a specific color component is subjected to intensive compression that is more than necessary. In this way, it is possible to provide the video signal which is multiplied by the proper knee change ratio (Y'/Y) to the camera process section 109.

EMBODIMENT 6

Figure 13:
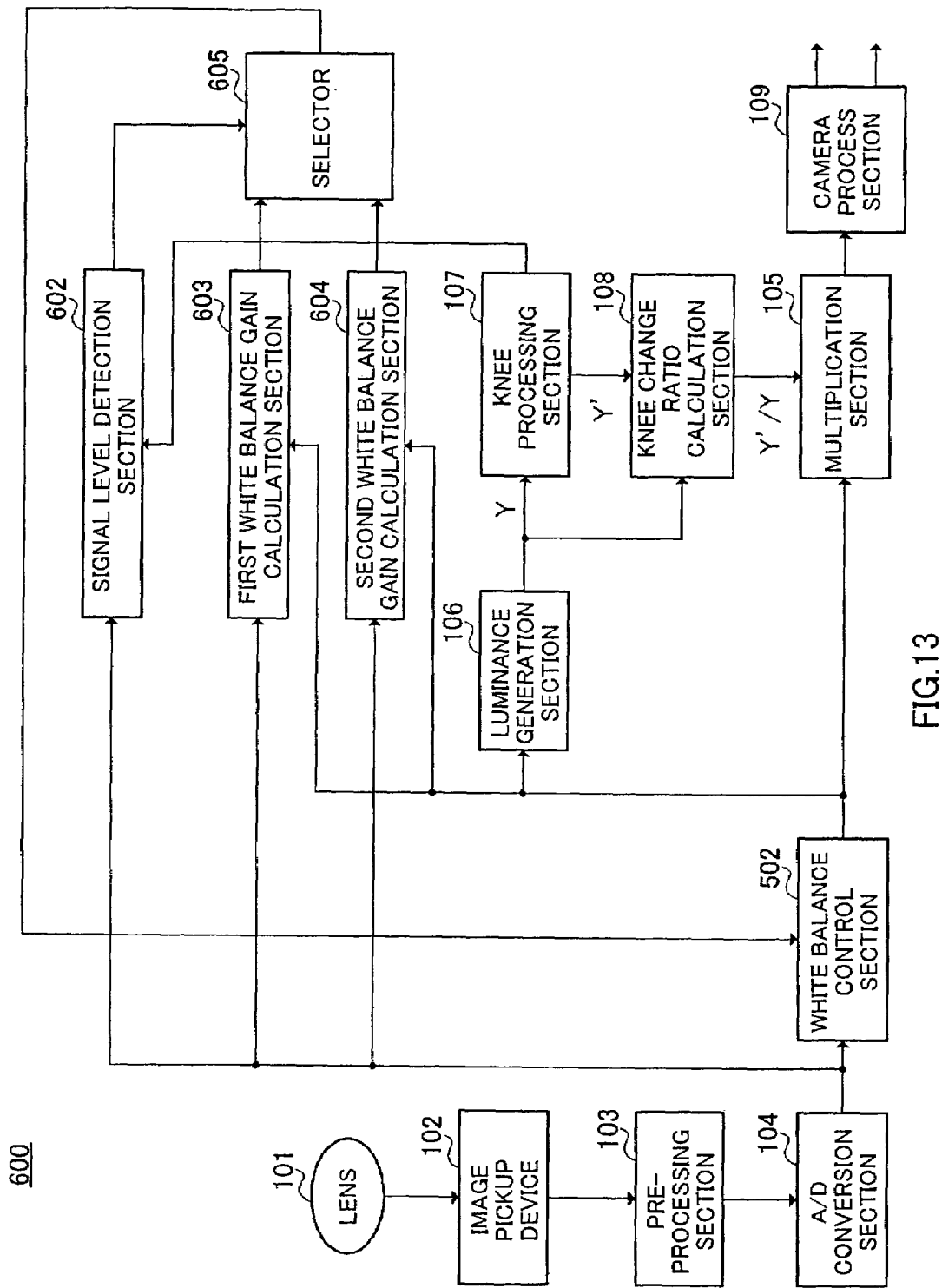
FIG. 13 is a block diagram illustrating the configuration of a video signal processing apparatus according to Embodiment 6 of the present invention.

FIG. 13 is a block diagram illustrating the configuration of video signal processing apparatus 600 of a video camera according to Embodiment 6 of the present invention. In the figure herein, the identical reference numerals are assigned to the parts identical to those in FIG. 12, and their detailed explanation is omitted here.

Video signal processing apparatus 600 illustrated in FIG. 13 has a configuration in which the white balance gain calculation section 503 of the video signal processing apparatus 500 according to Embodiment 5 described above with reference to FIG. 12 is replaced with two of white balance gain calculation sections 603 and 604 having characteristics different from each other, which are configured to be switched based on the signal level of the video signal detected at signal level detection section 602 for selection of either one.

Figure 14:
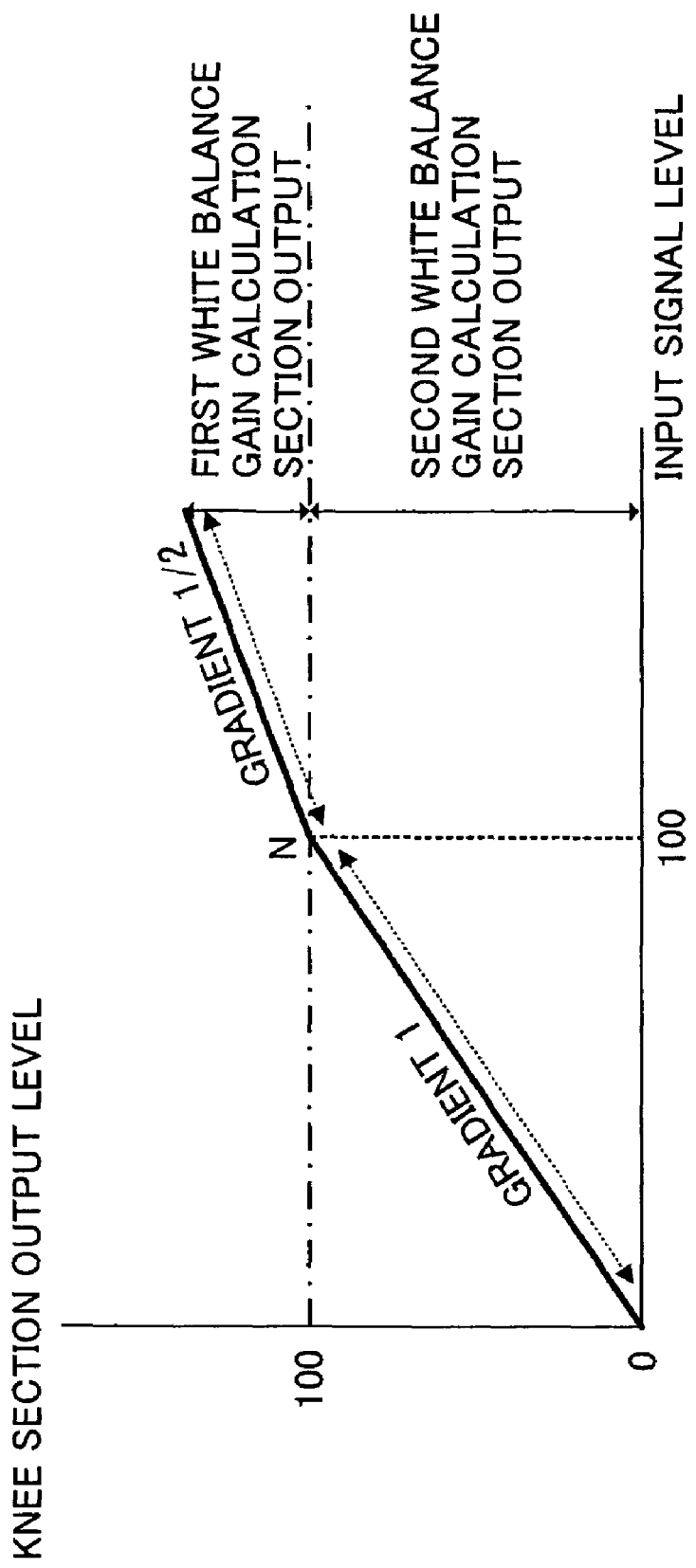
FIG. 14 is a schematic diagram illustrating the knee characteristics of a knee processing section according to Embodiment 6 of the present invention.

For example, as illustrated in FIG. 14, the signal level detection section 602 detects the signal level of a video signal prior to being subjected to white balance adjustment outputted from A/D conversion section 104, and in a case where the detected signal is greater than or equal to a knee point "100", the section 602 provides a signal indicating that the detected signal level is greater than the knee point to selector 605, which allows the selector 605 to select the output from the first white balance gain calculation section 603. On the other hand, in a case where the detected signal level of the video signal prior to being subjected to the white balance adjustment outputted from the A/D conversion section 104 is less than the knee point "100", the section 602 provides a signal indicating that the detected signal level is less than the knee point to the selector 605, which allows the selector 605 to select the output from the second white balance gain calculation section 604. Incidentally, the knee point is provided from knee processing section 107 to the signal level detection section 602.

As illustrated in FIG. 14, the first white balance gain calculation section 603, which is provided to calculate a white balance gain with which a white balance adjustment is performed on the signal level exceeding the knee point in knee processing, calculates the average value for each color in one screen, and further calculates a white balance gain which achieves equal color proportions between 2R−G and 2B−G based on the calculated average value. In a case where the knee processing is performed on a video signal (signal having the level exceeding the knee point) subjected to the white balance adjustment using the white balance gain calculated by the first white balance gain calculation section 603, the knee processing is performed based on input/output characteristics having a gradient of 1/2 as illustrated in FIG. 14. Accordingly, the white balance gain calculated by the first white balance gain calculation section 603 is weighted by a factor of 1/2 in comparison with the white balance gain calculated by the second white balance gain calculation section 604.

In contrast, the second white balance gain calculation section 604, which is provided to calculate a white balance gain with which a white balance adjustment is performed on the signal level not exceeding the knee point in knee processing, calculates the average value for each color in one screen, and further calculates a white balance gain which achieves equal color proportions between 2R−G and 2B−G based on the calculated average value. In a case where the knee processing is performed on a video signal (signal having the level not exceeding the knee point) subjected to the white balance adjustment using the white balance gain calculated by the second white balance gain calculation section 604, the knee processing is performed based on input/output characteristics having a gradient of 1 as illustrated in FIG. 14.

In this way, it is possible to perform a weighting processing on a white balance gain with a reference point (knee point) in knee processing at the knee processing section 107 serving as a threshold, which makes it further possible to make white balance adjustment on the signal level range of video signals which is subjected to compression during knee processing using a white balance gain adapted for the compression. This makes it possible to make white balance adjustment adapted for knee processing.

As described above, according to the video signal processing apparatus 600 of the present embodiment, a luminance signal Y which is generated for performing knee processing has been subjected to white balance adjustment in accordance with its signal level in advance, and accordingly the knee processing is performed based on the color-component-adjusted luminance signal Y which has been subjected to such color component adjustment adapted for the knee processing. In this way, it is possible to provide the video signal which is multiplied by the proper knee change ratio (Y'/Y) to the camera process section 109.

EMBODIMENT 7

Figure 15:
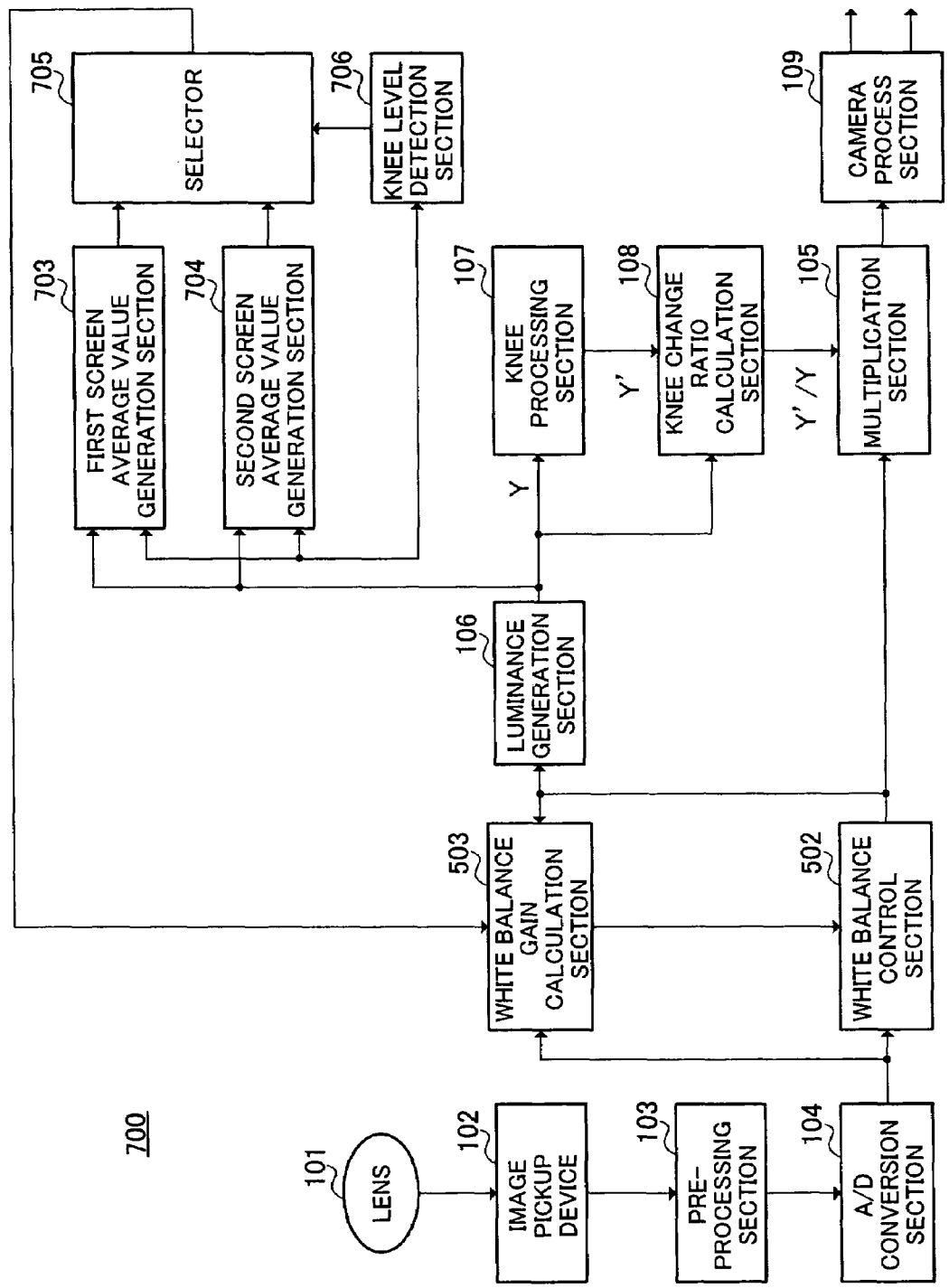
FIG. 15 is a block diagram illustrating the configuration of a video signal processing apparatus according to Embodiment 7 of the present invention.

FIG. 15 is a block diagram illustrating the configuration of video signal processing apparatus 700 of a video camera according to Embodiment 7 of the present invention. In the figure herein, the identical reference numerals are assigned to the parts identical to those in FIG. 12, and their detailed explanation is omitted here.

In FIG. 15, the video signal processing apparatus 700 has a difference in its configuration from that of the video signal processing apparatus 500 according to the Embodiment 5 described above with reference to FIG. 12 in that, in the apparatus 700, the white balance gain calculated at the white balance gain calculation section 503 of the apparatus 500 is subjected to weighting with the knee point in the knee processing section 107 serving as the threshold.

More specifically, according to the video signal processing apparatus 700 illustrated in FIG. 15, a luminance signal Y generated at luminance generation section 106 is provided to first screen average value generation section 703 and second screen average value generation section 704, respectively.

The first screen average value generation section 703 calculates the average value for one screen on the signal levels exceeding the knee point of knee processing section 107, whereas the second screen average value generation section 704 calculates the average value for one screen on the signal levels not exceeding the knee point of the knee processing section 107.

Figure 16:
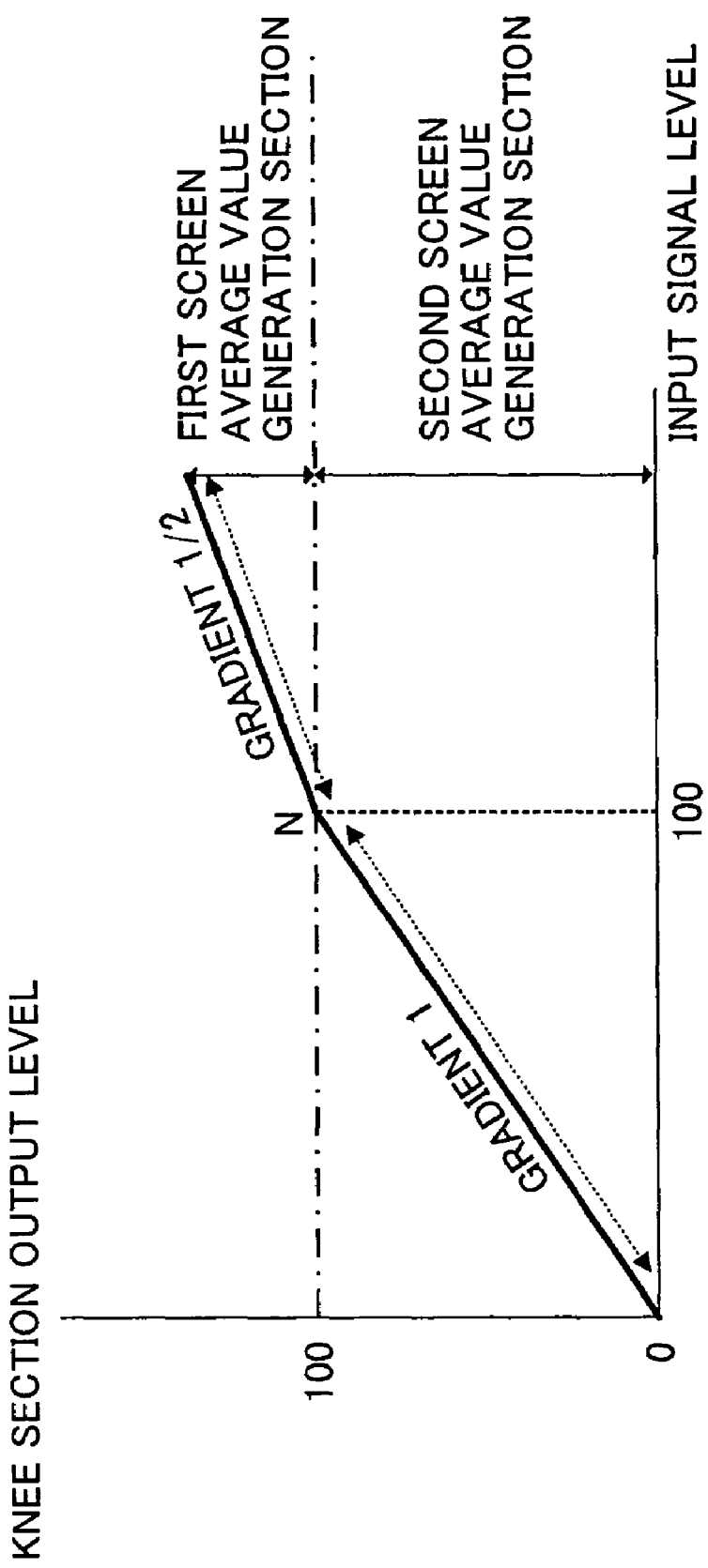
FIG. 16 is a schematic diagram illustrating the knee characteristics of a knee processing section according to Embodiment 7 of the present invention.

In performing such calculation, as illustrated in FIG. 16, assuming that the characteristics of a gradient 1/2 are set for a case where the signal level is greater than the knee point in the knee processing of the knee processing section 107 whereas the characteristics of a gradient 1 are set for a case where the signal level is less than the knee point in the knee processing of the knee processing section 107, an output from the first screen average value generation section 703 is pre-weighted to multiply the luminance average value for one screen by a factor of 1/2 whereas an output from the second screen average value generation section 704 is pre-weighted to multiply the luminance average value for one screen by a factor of 1.

Knee level detection section 706 then determines whether the signal level of a pixel which is the focus of knee processing is greater than the knee point in the knee processing or not, and controls selector 705 in such a way that the selector selects the output from the first screen average value generation section 703 in a case where the signal level is greater than the knee point whereas the selector selects the output from the second screen average value generation section 704 in a case where the signal level is less than the knee point.

This makes it possible to, at the output from the white balance gain calculation section 503, assign a weight to the white balance gain by selecting in a switching manner between the weighted average value provided from the first screen average value generation section 703 and the weighted average value provided from the second screen average value generation section 704 with the knee point in the knee processing serving as the threshold.

In this way, it is possible to perform a weighting processing on a white balance gain with a reference point (knee point) in knee processing at the knee processing section 107 serving as a threshold, which makes it further possible to make white balance adjustment on the signal level range of video signals which is subjected to compression during knee processing using a white balance gain adapted for the compression. This makes it possible to make white balance adjustment adapted for knee processing.

Therefore, it is possible to perform luminance generation based on the white-balance-adjusted video signal at the luminance generation section 106 provided at a later processing stage, and in addition, it is possible to perform knee processing properly based on the luminance signal subjected to the white balance adjustment. Moreover, because the change ratio (Y'/Y) calculated at knee change ratio calculation section 108 is also based on the white-balance-adjusted video signal, it is ensured that a proper calculation of the change ratio (Y'/Y) is performed.

Accordingly, because a video signal outputted from the white balance control section 502 is multiplied by the change ratio (Y'/Y) at the multiplication section 105 provided at a later processing stage, it is possible to provide a white-balanced video signal with its proper knee point considerations in knee processing to the camera process section 109.

As described above, according to the video signal processing apparatus 700 of the present embodiment, a luminance signal Y which is generated for performing knee processing has been subjected to white balance adjustment in accordance with its signal level in advance, and accordingly the knee processing is performed based on the color-component-adjusted luminance signal Y which has been subjected to such color component adjustment adapted for the knee processing. In this way, it is possible to provide the video signal which is multiplied by the proper knee change ratio (Y'/Y) to the camera process section 109.

It is noted that, though it is described in the above embodiment regarding a case where just two sets of screen average value generation sections (first screen average value generation section 703 and second screen average value generation section 704) are employed, the present invention is not limited to such a particular implementation; instead, it may alternatively be configured in such a way that more than two screen average value generation sections are provided, where in such a configuration, a weight is assigned to a luminance average value for one screen in accordance with knee characteristics in knee processing, thereby making it possible to perform a white balance adjustment with further greater accuracy.

EMBODIMENT 8

Figure 17:
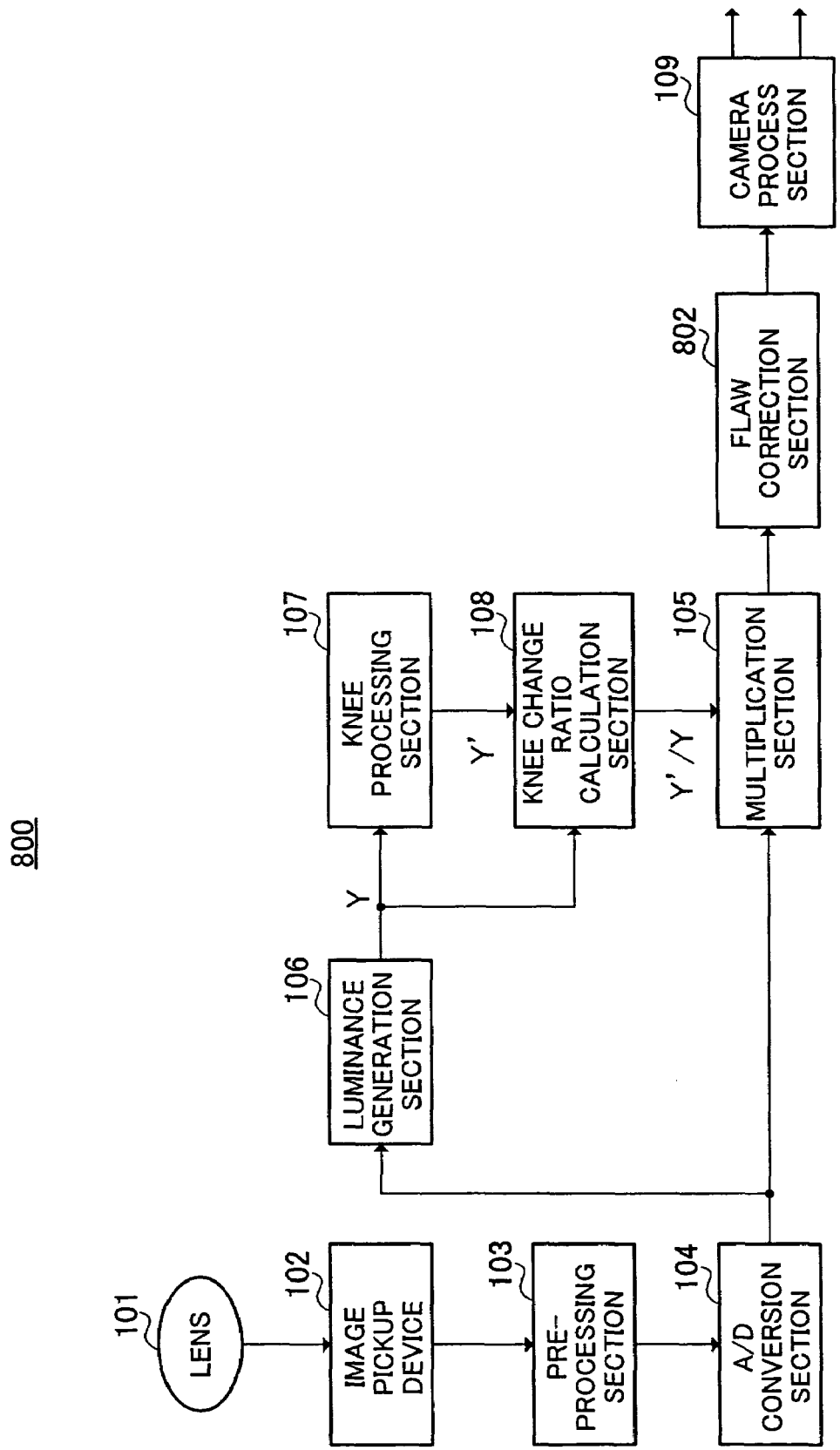
FIG. 17 is a block diagram illustrating the configuration of a video signal processing apparatus according to Embodiment 8 of the present invention.

FIG. 17 is a block diagram illustrating the configuration of video signal processing apparatus 800 of a video camera according to Embodiment 8 of the present invention. In the figure herein, the identical reference numerals are assigned to the parts identical to those in FIG. 2, and their detailed explanation is omitted here.

The video signal processing apparatus 800 illustrated in FIG. 17 has a difference in its configuration from that of the video signal processing apparatus 100 according to Embodiment 1 described above with reference to FIG. 2 in that, in the apparatus 800, there is an additional configuration component of flaw correction section 802 for performing flaw correction on a video signal subjected to knee change ratio (Y'/Y) multiplication at multiplication section 105.

That is, the flaw correction section 802 performs flaw detection on a video signal outputted from the multiplication section 105 based on the result of a comparison between each pixel of a video signal with its surrounding pixels and on the signal level for each pixel, and performs interpolation processing on the detected pixel based on the average value of its surrounding pixels to make flaw correction.

In performing such flaw correction, because the video signal outputted from the multiplication section 105 has not yet been subjected to filtering processing for generation of luminance signals and color difference signals, it is possible to perform flaw correction with a high accuracy.

For example, when a luminance signal is generated at the camera process section 109 based on a video signal provided from the multiplication section 105, because the video signal has a pattern in which color components are arranged as each of its pixels as illustrated in FIG. 3(B), the generation of the luminance signal is made by performing computation in accordance with (Eq. 4) or (Eq. 5) by using these adjacent pixels.

Supposing that flaw correction is performed on a certain flaw-detected pixel by using the average value of its surrounding pixels after performing such filter processing, a flaw in one pixel spreads into adjacent pixels used for generation of a luminance signal during the process of the filter processing for generating the luminance signal.

Therefore, according to the video signal processing apparatus 800 of the present embodiment, flaw correction is performed on a video signal inputted into camera process section 109, that is, a video signal prior to being subjected to the filter processing for generating the luminance signal and the color difference signal, which ensures the flaw correction to be performed without spreading of the flaw.

As described above, according to the video signal processing apparatus 800 of the present embodiment, it is possible to perform flaw correction on an output signal from the multiplication section 105 which has not yet been subjected to the filter processing for generating the luminance signal and the color difference signal. Accordingly, it is possible to alleviate the spreading of a flaw into its surrounding pixels, further making it possible to perform flaw detection accurately at the camera process section 109. In addition, it becomes unnecessary to provide a flaw correction circuit for each of luminance signals and color difference signals by performing flaw detection prior to generation of the luminance signals and the color difference signals, helping to avoid an increase in a circuit scale.

EMBODIMENT 9

Figure 18:
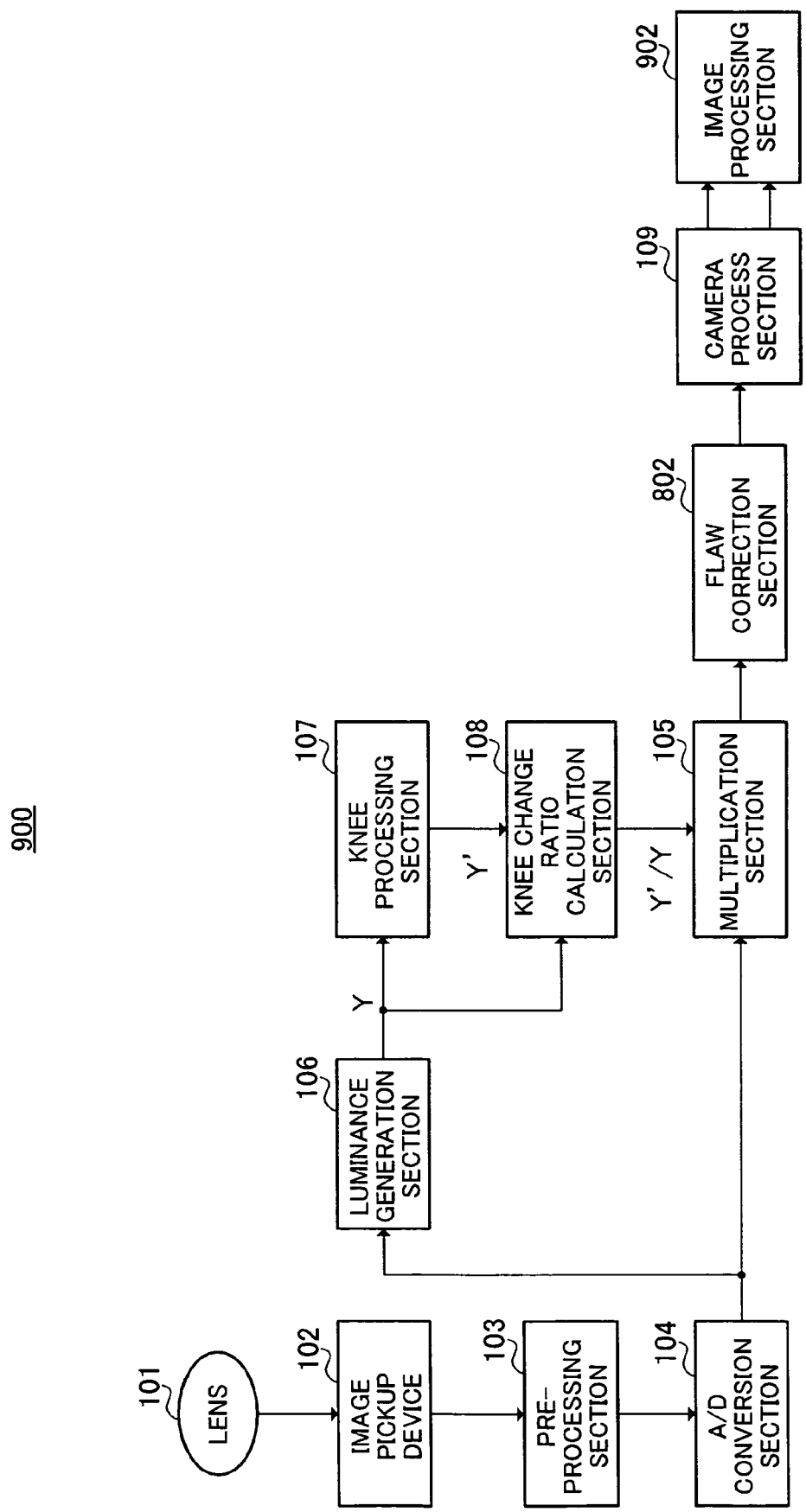
FIG. 18 is a block diagram illustrating the configuration of a video signal processing apparatus according to Embodiment 9 of the present invention.

FIG. 18 is a block diagram illustrating the configuration of video signal processing apparatus 900 of a video camera according to Embodiment 9 of the present invention. In the figure herein, the identical reference numerals are assigned to the parts identical to those in FIG. 17, and their detailed explanation is omitted here.

In FIG. 18, the video signal processing apparatus 900 has a configuration in which image processing section 902 for receiving an input of luminance signals and color difference signals outputted from camera process section 109 is additionally provided over the configuration of the video signal processing apparatus 800 according to the Embodiment 8 described above with reference to FIG. 17.

With such a configuration, the video signal processing apparatus 900 captures the status images of products running on a production line, and provides the captured images to the image processing section 902. In the same manner as in the case of the video signal processing apparatus 100 described above with reference to FIG. 2, the reduction of the effects from differing line concentration and false colors is fully accomplished on the luminance signals and the color difference signals outputted from the camera process section 109, which allows the image processing section 902, to which the luminance signals and the color difference signals are inputted, to render a proper determination on the color and the luminance level of the captured images. Accordingly, in an application case where a judgment is made on passing (good) products and defective (no-good) products based on the color and the luminance level of products running on a production line, the possibility of making an erroneous judgment on the color and the luminance level will be significantly low, which ensures a correct pass/fail judgment.

As described above, according to the video signal processing apparatus 900 of the present embodiment, it is possible to perform image processing featuring a greater accuracy with a rarer chance of making an erroneous judgment on the color or on the luminance level.

It is noted that, though it is described in the above embodiment regarding a case where the image processing section 902 renders a judgment on passing/failing products running on a production line, however, the present invention is not limited to such a particular implementation; instead, it is possible to implement the present invention in variations of other different applications, including, for example, one for monitoring a person going in and out of a room through image processing, or one for recognizing numbers on the number plate of an automobile running on a road, and so on.

As described above, according to the present invention, at the occasion of generating luminance signals and color differences based on the result of knee processing, it is possible to properly generate a luminance signal which is derived from the addition result of pixels next to each other and generate a color difference signal which is derived from a difference of the pixels next to each other, achieved by performing the knee processing while keeping the signal level ratio at least between the pixels next to each other on video signals made up of color components arranged on a pixel by pixel basis.

This specification is based on the Japanese Patent Application No. 2002-105528 filed on Apr. 8, 2002, the entire content of which is expressly incorporated by reference herein.

INDUSTRIAL APPLICABILITY

The present invention is applicable to an image capturing apparatus such as a video camera which captures and generates video signals through an image pickup device such as a CCD or the like.

The invention claimed is:

1. A video signal processing apparatus comprising:
an obtaining section that obtains video signals;
a luminance signal generating section that generates luminance signals from the obtained video signals; and
a knee processing section that performs knee processing on the generated luminance signals,
wherein said obtaining section comprises an image pickup device and a color filter for complementary color or primary color that is affixed to each pixel of said image pickup device, and obtains a sum of color components of a pair of pixels that are adjacent to each other in the image pickup device as a video signal for one pixel and obtains a sum of color components of another pair of pixels that are adjacent to each other and adjacent to the pair of pixels in the image pickup device as a video signal for a neighboring pixel,
wherein said luminance signal generating section generates a first luminance signal by averaging the sum of color components obtained as the video signal for the one pixel and the sum of color components obtained as the video signal for the neighboring pixel,
wherein said knee processing section performs the knee processing on the generated first luminance signal with one of first and second input/output characteristics, and
wherein said video signal processing apparatus further comprises:
a change ratio calculating section that calculates a change ratio in signal level of the first luminance signal, the change ratio being changed by the knee processing of said knee processing section;
a multiplying section that multiplies the obtained video signal for the one pixel and the video signal for the neighboring pixel by the calculated change ratio;
a signal processing section that performs predetermined signal processing on the video signal for the one pixel multiplied by the change ratio and the video signal for the neighboring pixel multiplied by the change ratio to obtain a second luminance signal and a color difference signal;
a white balance gain determining section that detects signal levels of the obtained video signals, and determines a white balance gain which matches with the input/output characteristics of the knee processing to be applied to the detected signal levels; and
a white balance adjusting section that adjusts a white balance of the obtained video signals using the determined white balance gain,
wherein said luminance signal generating section generates the first luminance signal from the video signals whose white balance is adjusted,
wherein said multiplying section multiplies the video signals whose white balance is adjusted, by the calculated change ratio, and
wherein said white balance gain determining section comprises:
a first average value calculating section that calculates a first average value, the first average value being an average value of signal levels of the generated first luminance signal, to which the first input/output characteristic is applied in the knee processing, and performs weighting on the calculated first average value based on the first input/output characteristic;

a second average value calculating section that calculates a second average value, the second average value being an average value of signal levels of the generated first luminance signal, to which the second input/output characteristic is the knee processing, and performs weighting on the calculated second average value based on the second input/output characteristic;

a selecting section that selects one of the weighted first and second average values based on a signal level of the first luminance signal on which knee processing is performed; and a white balance gain calculating section that calculates a white balance gain which matches with the input/output characteristic corresponding to the selected average value.

2. The video signal processing apparatus according to claim 1, wherein said knee processing section varies a knee characteristic in the knee processing, based on the generated first luminance signal.

3. A video signal processing method in a video signal processing apparatus comprising a color filter for complementary color or primary color that is affixed to each pixel of an image pickup device, the method comprising:

an obtaining step of obtaining video signals;

a luminance signal generating step of generating luminance signals from the obtained video signals; and a knee processing step of performing knee processing on the generated luminance signals, wherein said obtaining step comprises obtaining a sum of color components of a pair of pixels that are adjacent to each other in the image pickup device as a video signal for one pixel and obtaining a sum of color components of another pair of pixels that are adjacent to each other and adjacent to the pair of pixels in the image pickup device as a video signal for a neighboring pixel;

wherein said luminance signal generating step comprises generating a first luminance signal by averaging the sum of color components obtained as the video signal for the one pixel and the sum of color components obtained as the video signal for the neighboring pixel;

wherein said knee processing step comprises performing the knee processing on the generated first luminance signal with one of first and second input/output characteristics, and wherein said video signal processing method further comprises:

a change ratio calculating step of calculating a change ratio in signal level of the first luminance signal, the change ratio being changed by the knee processing of said knee processing step;

a multiplying step of multiplying the obtained video signal for the one pixel and the video signal for the neighboring pixel by the calculated change ratio;

a signal processing step of performing predetermined signal processing on the video signal for the one pixel multiplied by the change ratio and the video signal for the neighboring pixel multiplied by the change ratio to obtain a second luminance signal and a color difference signal;

a white balance gain determining step of detecting signal levels of the obtained video signals, and determining a white balance gain which matches with the input/output characteristics of the knee processing to be applied to the detected signal levels; and a white balance adjusting step of adjusting a white balance of the video signals using the determined white balance gain, wherein said luminance signal generating step comprises generating the first luminance signal from the video signals whose white balance is adjusted, wherein said multiplying step comprises multiplying the video signals whose white balance is adjusted, by the calculated change ratio, wherein said white balance gain determining step comprises:

a first average value calculating step of calculating a first average value, the first average value being an average value of signal levels of the generated first luminance signal, to which the first input/output characteristic is applied in the knee processing, and performing weighting on the calculated first average value based on the first input/output characteristic;

a second average value calculating step of calculating a second average value, the second average value being an average value of signal levels of the generated first luminance signal, to which the second input/output characteristic is applied in the knee processing, and performing weighting on the calculated second average value based on the second input/output characteristic;

a selecting step of selecting one of the weighted first and second average values based on a signal level of the first luminance signal on which knee processing is performed; and a white balance gain calculating step of calculating a white balance gain which matches with the input/output characteristics corresponding to the selected average value.

4. The video signal processing method according to claim 3, wherein said knee processing step varies a knee characteristic in the knee processing, based on the generated first luminance signal.

* * * * *